United States Patent
Heaton et al.

(10) Patent No.: US 10,429,535 B2
(45) Date of Patent: Oct. 1, 2019

(54) STATISTICAL ANALYSIS OF COMBINED LOG DATA

(71) Applicant: Schlumberger Technology Corporation, Sugar Land, TX (US)

(72) Inventors: Nicholas Heaton, Houston, TX (US); Jack LaVigne, Houston, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 1024 days.

(21) Appl. No.: 14/355,473

(22) PCT Filed: Oct. 31, 2012

(86) PCT No.: PCT/US2012/062705
§ 371 (c)(1),
(2) Date: Apr. 30, 2014

(87) PCT Pub. No.: WO2013/066953
PCT Pub. Date: May 10, 2013

(65) Prior Publication Data
US 2014/0320126 A1     Oct. 30, 2014

Related U.S. Application Data

(60) Provisional application No. 61/553,812, filed on Oct. 31, 2011, provisional application No. 61/635,343, filed on Apr. 19, 2012.

(51) Int. Cl.
*G01V 3/32* (2006.01)
*G01V 11/00* (2006.01)

(52) U.S. Cl.
CPC ............... *G01V 3/32* (2013.01); *G01V 11/00* (2013.01)

(58) Field of Classification Search
CPC ................................ G01V 3/32; G01V 11/00
(Continued)

(56) References Cited

U.S. PATENT DOCUMENTS 4,605,854 A * 8/1986 Smith, Jr. ............... G01V 5/107
250/266
5,973,321 A * 10/1999 Schmidt ................. G01V 5/125
250/269.6
(Continued)

FOREIGN PATENT DOCUMENTS

WO    WO 2010151354 A1 * 12/2010  ............. G01V 3/083

OTHER PUBLICATIONS

Cunha et al., Quantitative Risk Analysis for Uncertainty Quantification on Drilling Operations, 2005, Oil and Gas Business.*
(Continued)

*Primary Examiner* — Susan S Lee
(74) *Attorney, Agent, or Firm* — Sara K. M. Hinkley

(57) ABSTRACT

A method for determining at least one characteristic of a geological formation having a borehole therein may include collecting nuclear magnetic resonance (NMR) data of the geological formation adjacent the borehole, and collecting non-NMR data for the geological formation adjacent the wellbore. The method may further include performing a Monte Carlo analysis based upon a combination of the collected NMR and non-NMR data to determine the at least one characteristic of the geological formation having a bounded uncertainty associated therewith.

23 Claims, 16 Drawing Sheets

(58) Field of Classification Search
USPC .......................................................... 324/303
See application file for complete search history.

(56) References Cited

U.S. PATENT DOCUMENTS

| | | | | |
|---|---|---|---|---|
| 6,044,327 | A * | 3/2000 | Goldman | G01V 1/50 |
| | | | | 702/11 |
| 6,229,308 | B1 | 5/2001 | Freedman | |
| 6,346,813 | B1 | 2/2002 | Kleinberg | |
| 6,703,832 | B2 | 3/2004 | Heaton | |
| 7,526,413 | B2 * | 4/2009 | Dahlberg | G01V 3/38 |
| | | | | 703/10 |
| 7,538,547 | B2 | 5/2009 | Heaton | |
| 8,311,789 | B2 * | 11/2012 | Eyvazzadeh | E21B 47/00 |
| | | | | 324/303 |
| 2004/0041562 | A1 | 3/2004 | Speier | |
| 2004/0169511 | A1 | 9/2004 | Minh et al. | |
| 2008/0154509 | A1 * | 6/2008 | Heaton | G01V 11/00 |
| | | | | 324/303 |
| 2010/0010744 | A1 * | 1/2010 | Prange | G01V 3/32 |
| | | | | 324/303 |
| 2010/0185422 | A1 | 7/2010 | Hoversten | |
| 2011/0305371 | A1 * | 12/2011 | Liu | G01V 3/38 |
| | | | | 382/109 |
| 2013/0038463 | A1 * | 2/2013 | Heliot | G01V 3/18 |
| | | | | 340/853.1 |

OTHER PUBLICATIONS

Akkurt, et al., "From Molecular Weight and NMR Relaxation to Viscosity: An Innovative Approach for Heavy Oil Viscosity Estimation for Real-Time Applications", SPWLA 50th Annual Logging Symposium, The Woodlands, Texas, Jun. 21-24, 2009, pp. 1-15.
Akkurt, et al., "NMR Logging of Natural Gas Reservoirs", The Log Analyst, vol. 37, No. 6, 1996, pp. 33-42.
Bryan, et al., "Oil-Viscosity Predictions from Low-Field NMR Measurements", SPE 89070—SPE Reservoir Evaluation & Engineering, vol. 8 (1), 2005, pp. 44-52.
Burcaw, et al., "Improved Methods for Estimating the Viscosity of Heavy Oils from Magnetic Resonance Data", SPWLA 49th Annual Logging Symposium, Edinburgh, Scotland, May 25-28, 2008, pp. 1-14.
Freedman, et al., "A New NMR Method of Fluid Characterization in Reservoir Rocks: Experimental Confirmation and Simulation Results", SPE 63214—2000 Society of Petroleum Engineers Annual Technical Conference and Exhibition, Dallas, Texas, 2000, pp. 1-15.
Galford, et al., "Combining NMR and Conventional Logs to Determine Fluid Volumes and Oil Viscosity in Heavy-Oil reservoirs", SPE 63257—SPE Annual Technical Conference and Exhibition, Dallas, Texas, Oct. 1-4, 2000, pp. 1-12.
Heaton, et al., "4D NMR—Applications of the Radial Dimension in Magnetic Resonance Logging", SPWLA 48th Annual Logging Symposium, Austin, Texas, Jun. 3-6, 2007, pp. 1-15.
Heaton, et al., "Novel in Situ Characterization of Heavy Oil Integrating NMR and Dielectric Logs", SPWLA 53rd Annual Logging Symposium, Cartagena, Columbia, Jun. 16-20, 2012, pp. 1-13.
Heaton, et al., "Saturation and Viscosity From Multidimensional Nuclear Magnetic Resonance Logging", SPE 90564—SPE Annual Technical Conference and Exhibition, Houston, Texas, Sep. 26-29, 2004, pp. 1-11.

Hizem, et al., "Dielectric Dispersion: A New Wireline Petrophysical Measurement", SPE 116130—SPE Annual Technical Conference and Exhibition, Denver, Colorado, Sep. 21-24, 2008, pp. 1-21.
Hurlimann, et al.; "Diffusion-Editing: New NMR Measurement of Saturation and Pore Geometry", SPWLA 43rd Annual Logging Symposium, Jun. 2-5, 2002, pp. 1-14.
Latorraca, et al., "Heavy Oil Viscosity Determination Using NMR Logs", SPWLA 40th Annual Logging Symposium, 1999, pp. 1-11.
Little, et al., "Dielectric Dispersion Measurements in California Heavy Oil Reservoirs", SPWLA 51st Annual Logging Symposium, Perth, Australia, Jun. 19-23, 2010, pp. 1-11.
Liu, et al., "The Hla Method and the Integrated Work Flow for Estimating In-Situ Heavy Oil Viscosity with NMR and Conventional Logs", SPWLA 48th Annual Logging Symposium, Austin, Texas, Jun. 3-6, 2007, pp. 1-16.
Metropolis, et al., "Equation of State Calculations by Fast Computing Machines", The Journal of Chemical Physics, vol. 21 (6), Jun. 1953, pp. 1087-1092.
Minh, et al., "Planning and Interpreting NMR Fluid-Characterization Logs", SPE 84478—SPE Annual Technical Conference and Exhibition, Denver, Colorado, Oct. 5-8, 2003, 12 pages.
Morriss, et al., "Hydrocarbon Saturation and Viscosity Estimation from NMR Logging in the Belridge Diatomite", SPWLA 35th Annual Logging Symposium, Jun. 19-22, 1994, pp. 1-24.
Mosse, et al., "Dielectric Dispersion Logging in Heavy Oil: A Case Study from the Orinoco Belt", SPWLA 50th Annual Logging Symposium, The Woodlands, Texas, Jun. 21-24, 2009, pp. 1-16.
Prange, et al., "Quantifying uncertainty in NMR T2 spectra using Monte Carlo inversion", Journal of Magnetic Resonance, vol. 196, 2009, pp. 54-60.
Reed, et al., "A New Method for Estimating Waterflood Oil Recovery Efficiency Using Post-Waterflood NMR and Dielectric Well Logs, Belridge Field, California", SPE 153593—SPE Western Regional Meeting, Bakersfield, California, Mar. 19-23, 2012, pp. 1-17.
Salazar, et al., "Monte Carlo Optimization-Inversion Methods for NMR", SPWLA 50th Annual Logging Symposium, The Woodlands, Texas, Jun. 21-24, 2009, pp. 1-9.
Spalburg, et al., "Bayesian Uncertainty Reduction for Log Evaluation", SPE 88685—11th Abu Dhabi International Petroleum Exhibition and Conference, Oct. 10-13, 2004, pp. 1-11.
Straley, et al., "Core Analysis by Low Field NMR", SCA 9404—SCA Proceedings, 1994, pp. 43-56.
Toumelin, et al., "Pore-Scale Simulation of KHZ-GHZ Electromagnetic Dispersion of Rocks: effects of Rock Morphology, Pore Connectivity, and Electrical Double Layers", Society of Petrophysicists and Well Log Analysts 50th Annual Logging Symposium, The Woodlands, Texas, Jun. 21-24, 2009, pp. 1-11.
Wahl, et al., "The Dual Spacing Formation Density Log", SPE 989—Journal of Petroleum Technology, vol. 16 (12), 1964, pp. 1411-1416.
Yang, et al., "Viscosity Evaluation for NMR Well Logging of Live Heavy Oils", Petrophysics, vol. 53 (1), Feb. 2012, pp. 22-37.
International Search Report for International Application No. PCT/US2012/062705 dated Nov. 7, 2013.
Written Opinion for International Application No. PCT/US2012/062705, dated Nov. 7, 2013.

\* cited by examiner

STATISTICAL ANALYSIS OF COMBINED LOG DATA

BACKGROUND

Much of the oil and gas produced today comes from accumulations in the pore spaces of reservoir rocks—e.g., sandstone, limestone, or dolomites. The amount of oil and gas contained in a unit volume of the reservoir is the product of its porosity and the hydrocarbon saturation. In addition to porosity and hydrocarbon saturation, the volume of the formation containing hydrocarbon is used to estimate total reserves. Knowledge of the thickness and the area of the reservoir may be used for computation of its volume. To evaluate the producibility of a reservoir, a determination may be made as to how easily fluid can flow through the pore system. This property of the formation rock, which depends upon the manner in which the pores are interconnected, is its permeability. Thus, petrophysical parameters which may be used to evaluate a reservoir are its porosity, hydrocarbon saturation, thickness, area, and permeability.

However, few of these petrophysical parameters can be measured directly. Instead, they are often derived or inferred from the measurement of other physical parameters of the formations. The other parameters may include, among others, resistivity, bulk density, hydrogen content (also known as hydrogen index), natural radioactivity, response to magnetization, spontaneous potential, etc.

Logging is the process of gathering and recording geological information from deep within the earth. A log (or well log) is a measurement versus depth or time, or both, of one or more physical quantities in or around a well. Wireline logs are taken downhole, transmitted through a wireline to surface and recorded there. Measurements-while-drilling (MWD) and logging-while-drilling (LWD) logs are also taken downhole. They may be transmitted to surface by mud pulses (transmitting pressure pulses in the mud), or else recorded downhole and retrieved later when the instrument is brought to surface, for example. A logging tool carries out measurements from which petrophysical properties of the earth in its vicinity can be derived. This process is often called well log analysis or formation evaluation.

Borehole logging may provide a cost effective and practical solution for identifying and characterizing hydrocarbon resources, such as heavy oil. Nonetheless, the log analysis of heavy oil reservoirs may be very challenging using typical logging measurements. For example, such measurements may not provide desired information about viscosity. For this, other measurement techniques such as nuclear magnetic resonance (NMR) logging may be used. Transforms may then be used to relate NMR relaxation times to fluid viscosity.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A method for determining at least one characteristic of a geological formation having a borehole therein may include collecting nuclear magnetic resonance (NMR) data of the geological formation adjacent the borehole, and collecting non-NMR data for the geological formation adjacent the wellbore. The method may further include performing a Monte Carlo analysis based upon a combination of the collected NMR and non-NMR data to determine the at least one characteristic of the geological formation having a bounded uncertainty associated therewith.

A related well-logging system may include at least one well logging tool to measure nuclear magnetic resonance (NMR) data of a geological formation adjacent the borehole, and also to measure non-NMR data for the geological formation adjacent the wellbore. The system may also include a processor to perform a Monte Carlo analysis based upon a combination of the measured NMR and non-NMR data from the at least one well logging tool to determine the at least one characteristic of the geological formation having a bounded uncertainty associated therewith.

DETAILED DESCRIPTION

Figure 1:
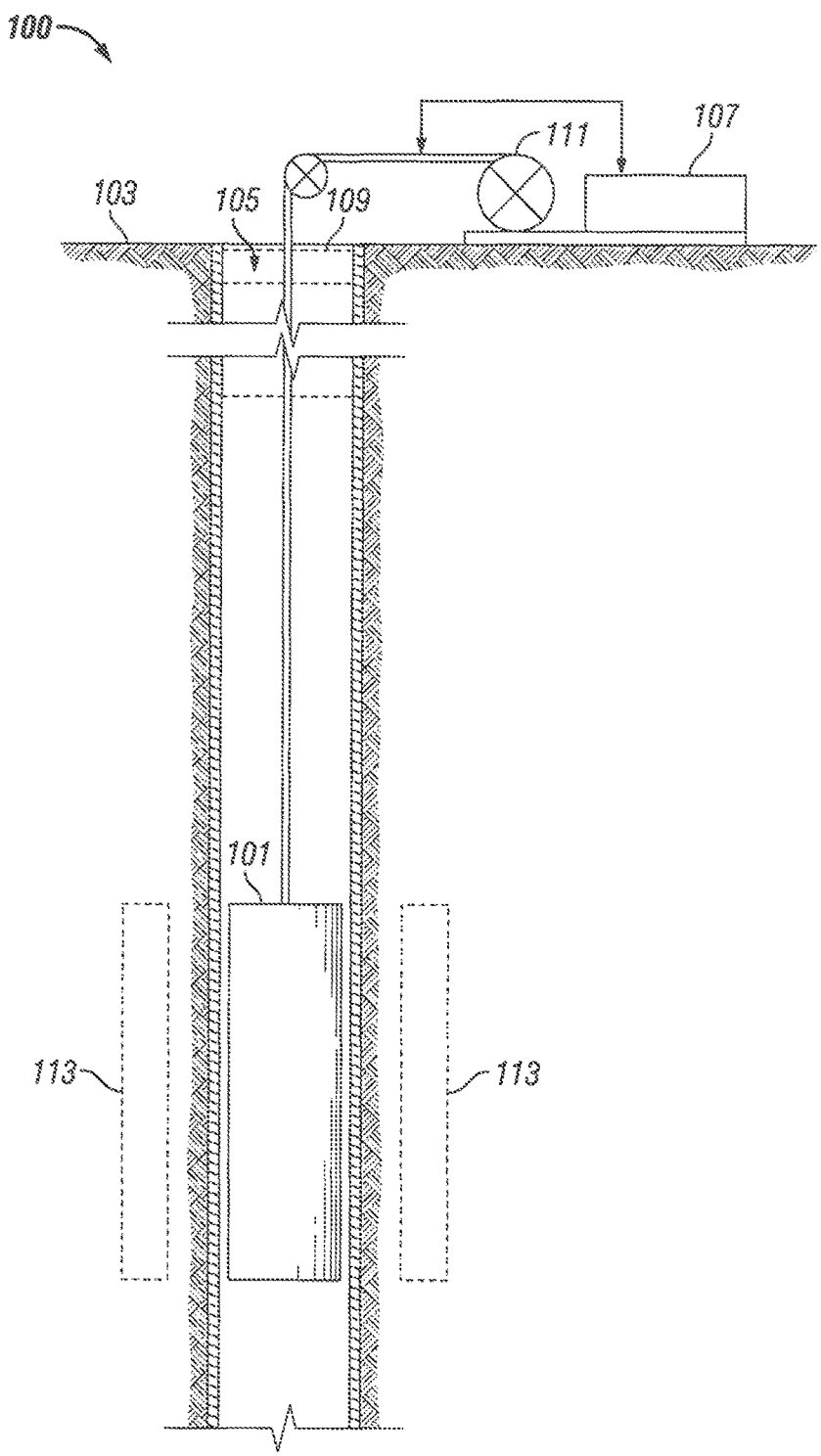
FIG. 1 is a schematic diagram of logging system which may be used for an integrated statistical analysis approach in accordance with an example embodiment.

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

In the following description, an approach for integrating NMR data and other non-NMR well log data using a simultaneous inversion approach to yield a fluid volume and a fluid viscosity is first described. Thereafter, an approach for performing a statistical analysis of combined NMR/non-NMR data to provide one or more characteristics of a geological formation having a bounded uncertainty is described.

By way of background, various logging tools may be used, either separately or in combination, to gather logs of the above-described formation parameters. For example, since resistivity of oil and gas is much higher than that of water with dissolved salts, oil soaked rock generally has a higher resistivity than a water soaked rock. Thus, a resistivity log may give an indication of what is in the ground. The following paragraphs briefly introduce a few logging tools.

Density logs are primarily used as porosity logs. A radioactive source, applied to the borehole wall, emits medium-energy gamma rays into the formations. These gamma rays may be thought of as high-velocity particles that collide with the electrons in the formation. At each collision a gamma ray loses some, but not all, of its energy to the electron, and then continues with diminished energy. This type of interaction is known as Compton-scattering. The scattered gamma rays reaching the detector, at a fixed distance from the source, are counted as an indication of formation density. See J. S. Wahl, et al., The Dual Spacing Formation Density Log, J. Pet. Tech., December 1964.

The number of Compton-scattering collisions is related directly to the number of electrons in the formation. Consequently, the response of the density tool is determined based upon the electron density (number of electrons per cubic centimeter) of the formation. Electron density is related to the true bulk density, $\rho$, which in turn depends on the density of the rock matrix material, the formation porosity, and the density of the fluids filling the pores. A density well log measurement may be expressed in the form shown below in Equation (1).

$$\rho = \rho_{wat}v_{wat} + \rho_{oil}v_{oil} + \rho_{gas}v_{gas} + \rho_m(1-v_{wat}-v_{oil}-v_{gas}), \quad (1)$$

where the density, $\rho$, is the bulk density measured by the well log tool, and $\rho_{wat}$, $\rho_{oil}$, $\rho_{gas}$ and $\rho_m$ are the average densities of water, oil, gas and the formation, respectively. Although density logs are quite effective in analyzing the formation porosity, errors may enter the well log analysis due to the presence of shale, and due high fluid pressure.

Another example of a well log tool is the conductivity well log tool. Conductivity (or its reciprocal, resistivity) has units milliohms (milliohms) per meter. Most formations logged for potential oil and gas saturation are made up of rocks which, when dry, will not conduct an electric current. That is, the rock matrix has zero conductivity and infinitely high resistivity. An electrical current will flow through the interstitial water saturating the pore structure of the formation. Conductivity measurements are desirable for saturation determinations. Conductivity measurements, along with porosity and water resistivity, are used to obtain values of water and hydrocarbon saturation. The following equation may be used in connection with data obtained from a conductivity well log tool.

$$C_{XO} = C_m V^m_{wat} \quad (2)$$

Where $C_{XO}$, $C_m$, and $V^m_{wat}$ are the conductivity at a given water saturation, conductivity of mud filtrate and volume of water in the mud formation, respectively.

Yet another example of a well log tool is the neutron log. Neutron logs are used principally for delineation of porous formations and determination of their porosity. They respond primarily to the amount of hydrogen in the formation. Thus, in clean formations whose pores are filled with water or oil, the neutron log reflects the amount of liquid filled porosity. Gas zones can often be identified by comparing the neutron log with another porosity log of a core analysis. The combination of the neutron log with one or more other porosity logs yields even more accurate porosity values and lithology information.

Neutrons are electrically neutral particles, each having a mass almost identical to the mass of a hydrogen atom. High-energy neutrons are continuously emitted from a radioactive source. These neutrons collide with the nuclei of the formation materials in what may be thought of as "billiard-ball" collisions. With each collision, the neutron loses some of its energy. The amount of energy lost per collision depends on the relative mass of the nucleus with which the neutron collides. The greater energy loss occurs when the neutron strikes a nucleus of practically equal mass—i.e., a hydrogen nucleus. Collisions with heavy nuclei do not slow the neutron appreciably. Thus, the slowing of neutrons depends largely on the amount of hydrogen in the formation. An example of the approximate representation of the neutron log measurement is shown in the following equation:

$$PHI = HI_{wat}v_{wat} + HI_{oil}v_{oil} + HI_{gas}v_{gas} \quad (3)$$

where $HI_{wat}$, $HI_{oil}$, and $HI_{gas}$, are the hydrogen indices of water, oil and gas respectively, and $v_{wat}$, $v_{oil}$, and $v_{gas}$ are the fluid volumes of water, oil and gas, respectively.

The foregoing well log tools and their measurements may be considered as non-NMR well log tools and non-NMR well log measurements, respectively. The following paragraphs briefly describe the Nuclear Magnetic Resonance (NMR) tool.

NMR logging tools may use large permanent magnets to create a strong static magnetic polarizing field inside the formation. The hydrogen nuclei of water and hydrocarbons are electrically charged spinning protons that create weak magnetic field, similar to tiny bar magnets. When a strong external magnetic field from the logging tool passes through a formation containing fluids, these spinning protons align themselves like compass needles along the magnetic field. This process, called polarization, increases exponentially with a time constant, $T_1$, as long as the external magnetic field is applied. A magnetic pulse from the antenna rotates, or tips, the aligned protons into a plane perpendicular, or transverse, to the polarization field. These tipped protons immediately start to wobble or precess around the direction of the strong logging-tool magnetic field.

The precession frequency, called the Larmor frequency, is proportional to the strength of the external magnetic field. The precessing protons create an oscillating magnetic field, which generates weak radio signals at this frequency. The total signal amplitude from the precessing hydrogen nuclei (e.g., a few microvolts) is a measure of the total hydrogen content, or porosity, of the formation.

The rate at which the proton precession decays is called the transverse relaxation time, $T_2$, which reacts to the environment of the fluid—the pore-size distribution. $T_2$ measures the rate at which the spinning protons lose their alignment within the transverse plane. It depends on three factors: the intrinsic bulk-relaxation rate in the fluid; the surface-relaxation rate, which is an environmental effect; and relaxation from diffusion in a polarized field gradient, which is a combination of environmental and tool effects. There is no diffusion contribution to $T_1$.

The spinning protons will quickly lose their relative phase alignment within the transverse plane because of variations in the static magnetic field. This process is called the free induction decay (FID), and the Carr-Purcell-Meiboom-Gill (CPMG) pulse-echo sequence is used to compensate for the rapid free-induction decay caused by reversible transverse dephasing effects.

The three components of the transverse relaxation decay play a significant role in the use of the $T_2$ distribution for well logging applications. For example, the intrinsic bulk relaxation decay time is caused principally by the magnetic interactions between neighboring spinning protons in the fluid molecules. These are often called spin-spin interactions. Molecular motion in water and light oil is rapid, so the relaxation is inefficient with correspondingly long decay-time constants. However, as liquids become more viscous, the molecular motion is slower. Then the magnetic fields, fluctuating due to their relative motion approach the Larmor precession frequency, and the spin-spin magnetic relation interactions become much more efficient. Thus, tar and viscous oils can be identified because they relax relatively efficiently with shorter $T_2$ decay times than light oil or water.

Fluids near, or in contact with, grain surfaces relax at a much higher rate than the bulk fluid relaxation rate. Because of complex atomic level electromagnetic field interactions at the grain surface, there is a high probability that the spinning proton in the fluid will relax when it encounters a grain surface. For the surface relaxation process to dominate the decay time, the spinning protons in the fluid makes multiple encounters with the surface, caused by Brownian motion, across small pores in the formation. They repeatedly collide with the surface until a relaxation event occurs. The resulting $T_2$ distribution leads to a natural measure of the pore-size distribution.

The approach described above comes from early generation NMR logging tools, which measured simple echo trains that solely reflected $T_2$ distributions. More recent NMR tools acquire more complex datasets that contain information about $T_2$ distributions, and also about $T_1$ (longitudinal relaxation time) and molecular diffusion rates, D. These properties—in particular molecular diffusion rates—are highly dependent on the fluid types, as explained below.

Relaxation from diffusion in the polarization field gradient is a technique used to differentiate oil from gas. See R. Akkurt et al., "NMR Logging of Natural Gas Reservoirs", The Log Analyst, no. 6 November-December 1996. Because the spinning protons move randomly in the fluid, any magnetic field gradients will lead to incomplete compensation with the CPMG pulse-echo sequence. For example, between spin-flipping pulses, some protons will drift—due to their Brownian motion—from one region to another of different field strength, which changes their precession rate. As a result, they will not receive the appropriate phase adjustment for their previous polarization environment. This leads to an increase in the observed transverse dephasing relaxation rate. Gas has relatively high mobility compared with oil and water, and therefore, the spinning protons in gas have a much larger diffusion effect.

The preceding paragraphs described various well logs that can be used for formation evaluation. Once the well logs are collected they may be input to a data processing unit that performs well log analysis. An objective of well log analysis is to determine the mineral and fluid volumes that constitute the earth formation as a function of depth. This is achieved by analyzing a plurality of well log measurements (multi-tool analysis) that have previously been acquired by logging tools. In general, the physical properties measured by the tools are not the fluid or mineral volumes themselves. However, each of the measurements is largely determined by (at least) a subset of the volumes. Well log analysis is then performed by first expressing each logging tool response in terms of the volumes and then computing the set of volumes that provide the overall best agreement between the computed tool responses and the actual measured log values.

For each tool, the physical properties submitted to the well log analysis are themselves derived by previous processing of raw data such as count rates (gamma ray log), voltage amplitudes, frequencies and signal phase differences. For NMR tools, the pre-processing stage involves calibration (in terms of NMR volume fractions) of echo amplitudes and the mathematical inversion of echo amplitude decays to provide $T_2$ (transverse relaxation time) distributions. The quantity eventually submitted to the multi-tool analysis is the NMR porosity, which is the sum of the amplitudes in the $T_2$ distribution. In some cases a NMR bound fluid volume, computed as the sum of $T_2$ distribution components falling below a specified $T_2$ cutoff value, is also given as an input to the analysis. The NMR porosity and bound fluid volumes are related to the formation fluid volumes by the respective fluid hydrogen indices.

However, current multi-tool log analysis techniques take no account of diffusion effects on the transverse relaxation time. Instead, NMR fluid analysis is performed independently, and results are then compared with the results of conventional multi-tool analysis. Although this approach is useful in environments where conventional methods may be inaccurate (e.g., low resistivity pay), in many other cases it does not take full advantage of the available data.

Mathematical inversion of NMR data takes NMR properties (namely relaxation times $T_1$ and/or $T_2$ and Diffusion D) and relates these properties to specific fluids. Two types of NMR inversion have been proposed for diffusion based NMR logs. The first type is a model-based approach, one example of which is the Magnetic Resonance Fluid (MRF) characterization method as described in U.S. Pat. No. 6,229,308 issued to Freedman et al. This method involves making multiple NMR measurements with different parameters and simultaneously analyzing the data in a forward model inversion. The MRF method invokes the Constituent Viscosity Model (CVM), which relates relaxation time and diffusion rates to phenomenological constituent viscosities whose geometric mean is identical to the macroscopic fluid viscosity. In addition to fluid volumes, the method provides estimates of the oil viscosity. The MRF technique represents the most comprehensive and accurate method currently available for NMR fluid characterization in well-logging. Unlike previous methods, the MRF method is applicable to any suite of NMR measurements and is not limited to CPMG sequences and is commonly applied to diffusion editing (DE) measurements.

The second type of inversion is independent of any fluid model. Instead, the 3DNMR method, as described in Chanh Cao Minh et al., "Planning and Interpreting NMR Fluid- Characterization Logs", SPE paper 84478, presented at the SPE Annual Technical Conference and Exhibition, 5-8 Oct. 2003, Denver, Colo.; and Nick J. Heaton et a, "Saturation and Viscosity from Multidimensional Nuclear Magnetic Resonance Logging", SPE paper 90564, presented at the SPE Annual Technical Conference and Exhibition, 26-29 Sep. 2004, Houston, Tex., provides a graphical representation of the NMR responses in the form of cross-plots (often referred to as maps) of NMR properties such as D vs. $T_2$ or D vs. $T_1$. By inspecting these $D-T_1$ and $D-T_2$ maps it is often possible to identify different fluids and assign NMR responses to them based on the location of the corresponding peaks in the maps. Fluid volumes can be computed either by direct integration of the peak amplitudes if the peaks are well-resolved, or by applying deconvolution methods (equivalent to MRF analysis) if they are not.

Another approach to NMR fluid-typing involves the comparison of different measurements acquired at different depths of investigation (See U.S. Pat. No. 6,703,832 issued to Heaton et al.). This method exploits the variation in fluid saturations at different depths of investigation caused by invading mud filtrate. In general, deeper measurements are more likely to sense native fluids while shallower measurements sense a greater proportion of filtrate. Because the filtrate NMR response is generally known, differences in NMR response between the two sets of measurements provide an indication of the fluid type at the deeper depth of investigation.

The techniques described above rely on measuring NMR properties, namely relaxation times and diffusion rates and relating these properties to specific fluids. The principal attractions of the NMR methods are (a) that they can function in environments where conventional resistivity-based saturation analysis is unsuitable or inaccurate (e.g., low contrast or low resistivity pay) and (b) that they can also provide information on oil viscosity. The extended range of viscosity estimate derived from combined NMR data has significant potential in heavy oil reservoirs.

Turning now to FIG. 1, a schematic diagram of logging system 100 which may be used for implementing the techniques described herein is first describe. A downhole tool 101 is suspended in wellbore 105 by a cable 109, and disposed proximate an investigation area 113 from which data are to be obtained. The cable length is used to control depth and thus is controlled by suitable means at the surface 103 such as a drum and winch mechanism 111. Surface equipment 107, placed at a surface location, may include a processing system. The cable 109 may include a communication link configured to transfer data between the downhole tool 101 and the processing system at the surface equipment 107. The communication system may be of an electrical, mechanical or electromechanical type, and may comprise of copper wire, fiber-optic cable, etc.

Figure 2:
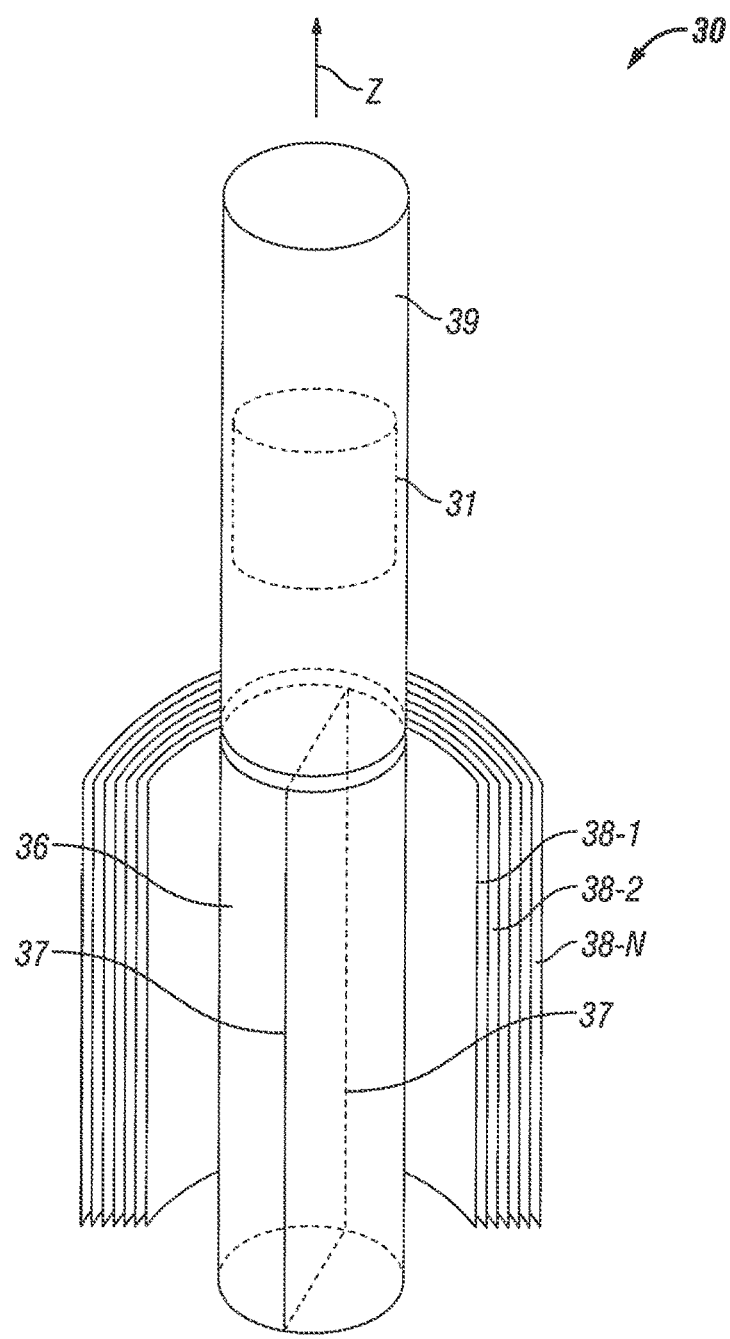
FIG. 2 is an example downhole well-logging tool including an NMR measurement device and at least one additional well log measurement device which may be used with the logging system of FIG. 1.

An example downhole tool 30 is now described with reference to FIG. 2, which illustratively includes a nuclear magnetic resonance (NMR) logging device and a non-NMR logging device 31 (e.g., neutron measurement device, gamma ray measurement device, etc.) carried within a housing 39 for use in wireline logging applications as shown, or of a type that can be employed in logging while drilling (LWD) or measurement while drilling (MWD) applications. The NMR logging device may produce a static magnetic field in the formation (e.g., using a permanent or magnet array), and may include one or more radio frequency (RF) antennas for producing RF magnetic field pulses in the formations and for receiving the spin echoes from the formations. By way of example, the NMR logging device may be operated to obtain separate measurements from a plurality of closely spaced thin shell regions in the surrounding formations. In the illustrated example, the NMR logging device includes a first centralized magnet or magnet array 36 and an RF antenna 37, which may be a suitably oriented coil or coils. FIG. 2 also illustrates a general representation of the type of closely spaced cylindrical thin shells, 38-1, 38-2 . . . 38-N, that may be frequency selected using the referenced type of multi-frequency logging device. Further details on the downhole tool 30 may be found in the above-noted U.S. Pat. No. 6,229,308, which is hereby incorporated herein in its entirety by reference.

An example embodiment relates to integration of NMR data that includes both diffusion and relaxation time information with conventional well log measurements. This approach takes into account the available information to allow better understanding of the fluid types within the formations.

Figure 3:
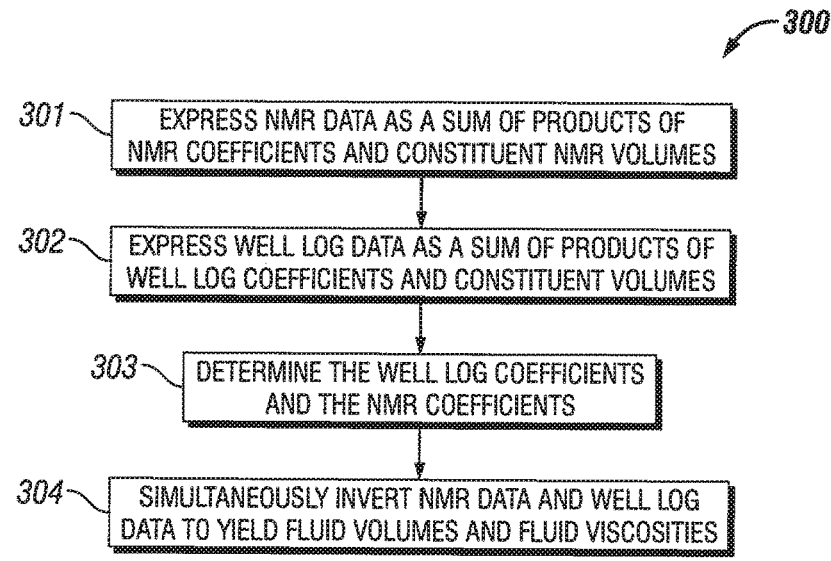
FIG. 3 is a flow diagram of a method for integrating NMR data with other well log measurements in accordance with an example embodiment.

A flow diagram 300 of a method for integrating NMR data and well log data is shown in FIG. 3. NMR data, including diffusion and relaxation time information, is expressed as a sum of NMR subcomponents. The following equations express the individual NMR echoes as a summation of products of the NMR coefficient and NMR volumes.

Echo(1)=$F(1;T21,D1)V(T21,D1)+F(1;T22,D1)V(T22, D1)+\_+F(1;T2N,DN)V(T2N,DN)$

Echo(2)=$F(2;T21,D2)V(T21,D2)+F(2;T22,D2)V(T22, D2)+\_+F(2;T2N,DN)V(T2N,DN)$

. . . =_ . . .

Echo(n)=$F(n;T21,D1)V(T21,D1)+F(n;T22,D1)V(T22, D1)+\_+F(n;T2N,DN)V(T2N,DN)$ (4)

Equation set (4) depicts NMR measurements in terms of echo amplitudes. The NMR measurements may also be expressed in other forms (e.g. Window sums, etc.). The NMR coefficient F (k; T2i, D j) is given by the following equation:

$$F(k; T2_i.D_j) = HI(T2_i, D_j)\exp\left(\frac{-kTE}{T2_i}\right)\cdot \exp\left(-kTED_j\gamma^2 G^2\frac{TE^2}{12}\right) \quad (5)$$

Where k is the echo index, TE is the echo spacing of the NMR measurement, $\gamma$ is the gyromagnetic ratio, and G is the magnetic field gradient.

The NMR volumes, V (T2i, D j), are proportional to the fluid volume and the fluid hydrogen index. Note that Equation (4) gives a general form of analyzing NMR measurements. If the method used to invert the data does not use a fluid model, for example, as set forth in U.S. Patent Application No. US2004/0169511 where NMR measurement is interpreted on a D-$T_2$ map, then each NMR subcomponent in Equation (4) may represent a pixel on the D-$T_2$ map. If the inversion method assumes a fluid model, as in the MRF method (Freedman '308), then the index j in D j may correspond to the number of fluids incorporated in the model.

After expressing the NMR measurement data in the form depicted in Equation (4), the method expresses at least one additional well log measurement as a sum of products of well log coefficients and functions of diffusion value and relaxation time (302). For example, the additional well log measurement may include, but is not limited to, a density log, conductivity log, neutron log, sonic log, etc. Equations (1), (2) and (3) may be expressed in the form of fluid volumes and well log coefficients as shown below:

$$\rho m - \rho = (\rho m - \rho wat)vwat + (\rho m - \rho oil)voil + (\rho m - \rho gas)vgas \quad (6)$$

$$C_{XO}^{1/m} = C_{mf}^{1/m} v_{wat}^{m} \quad (7)$$

$$MRP = HI_{wat} v_{wat} + HI_{oil} v_{oil} + HI_{gas} v_{gas} \quad (8)$$

Equations (6), (7) and (8) express various well log measurements directly in terms of true fluid volumes. Note that each expression is a sum of products of the well log coefficients and the fluid volumes. These equations are subsequently combined with the equations shown in the Equation set (4). Following is the result of one example of such combined analysis:

$$\text{Echo}(1) = f(1; T2_1, D_1)v(T2_1, D_1) + f(1; T2_2, D_1)v(T2_2, D_1) + \ldots + f(1; T2_N, D_N)v(T2_N, D_N) \quad (9)$$

$$\text{Echo}(2) = f(2; T2_1, D_2)v(T2_1, D_2) + f(2; T2_2, D_2)v(T2_2, D_2) + \ldots + f(2; T2_N, D_N)v(T2_N, D_N)$$

$$\vdots = \vdots \quad \vdots \quad \vdots$$

$$\text{Echo}(n) = f(n; T2_1, D_1)V(T2_1 D_1) + f(n; T2_2, D_1)v(T2_2, D_1) + \ldots + f(n; T2_N, D_N)v(T2_N, D_N)$$

$$\rho - \rho_m = [\rho(T2_1, D_1) - \rho_m]v(T2_1 D_1) + [\rho(T2_2, D_1) - \rho_m]v(T2_2 D_1) + \ldots + [\rho(T2_N, D_N) - \rho_m]v(T2_N D_N)$$

$$C_{XO}^{1/m} = C^{1/m}(T2_1, D_1)v(T2_1 D_1) + C^{1/m}(T2_2, D_1)v(T2_2 D_1) + \ldots + C^{1/m}(T|2_N, D_N)v(T2_N D_N)$$

Equation set (9) shows the combined NMR echo equations in addition to the well log measurements expressed in terms of diffusion and relaxation time $T_2$. Note the now modified density and conductivity measurements and the NMR measurements are associated with the same set of volumes. In addition, the NMR coefficient now takes into account the hydrogen index as shown in Equation (10):

$$F(k; T2_i, D_j) = HI(T2_i, D_j) \exp\left(\frac{-kTE}{T2_i}\right) \cdot \exp\left(-kTED_j \gamma^2 G^2 \frac{TE^2}{12}\right) \quad (10)$$

Subsequently, at Block 303, the values of the well log coefficients are determined. Note that determining values of the well log coefficients may be dependent on the inversion process employed. Once the well log and NMR coefficients are known, the remaining unknowns in the Equation set (9) are the fluid volumes.

The equations in Equation set (9) are simultaneous equations that are solved 304 to give fluid volumes and fluid viscosities. The solving may be a mathematical inversion, that may generate fluid volume and viscosity distributions from the given data. Various inverting methods may be used. For example, the MRF method (Freedman '308), 3D-NMR, etc. In addition, in the NMR measurements, the transverse relaxation time $T_2$, may be replaced by longitudinal relaxation time $T_1$.

Figure 4:
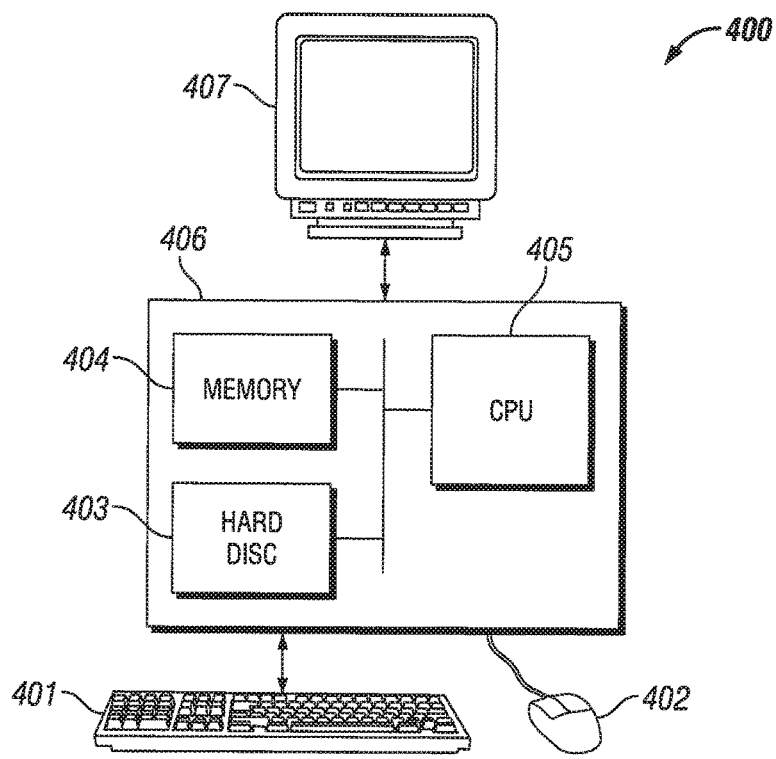
FIG. 4 is a schematic block diagram of a system for integrating NMR data and other well log measurements in accordance with an example embodiment.

FIG. 4 shows a system 400 for integrating NMR data and at least one additional well log data. The system 400 includes an input device such as a keyboard 401, mouse 402 and a hard disk drive 403. Other input devices may also be used. The input device may also include PCMCIA cards, floppy disc drives, network connection, cables, or any other medium that allows data to be inputted to the computer. The NMR data and the well log data may be inputted to the computer with aid of the input device. The system 400 also includes a processor for processing the NMR data and the well log data inputted into the system 400. The processor includes a central processing unit (CPU) 405. The processor may execute a set of instructions that may be stored within the memory 404, the hard disk drive 403 or may be inputted into the system via any of the aforementioned input means. The CPU 405 executes instructions to express the NMR data as a summation of NMR subcomponents, where each NMR subcomponent is a product of NMR coefficient and a function of diffusion values and relaxation time values. This processing may have a result similar to the Equation set (4). The processor also executes instructions to express the well log measurement as a summation of well log subcomponents, where each well log subcomponent is a product of a well log coefficient and the function of diffusion values and relaxation time values. The result of this operation may be similar to the Equation set (9). The processor may also execute instructions to determine the values of the coefficients in Equation set (9). The processor may subsequently execute instructions that simultaneously invert the NMR data and the well log measurement to yield fluid volumes and oil viscosities. The fluids of interest may be water, oil, and gas.

The system 400 also has an output device, for example a display monitor 407, that displays the fluid volumes and fluid viscosities to a user. The output device may also include, but is not limited to, a printer, a hard disk drive 403, memory 404, a network connection, etc. The system 400 also illustratively includes a user interface to allow the user to select, for example, the given number of well log measurements to be included in the processing. The user interface means may include, but is not limited to, a mouse 402, a keyboard 401, etc. The user may select a well log measurement from any available measurements of density, resistivity, neutron porosity, sonic, etc. The user interface allows the user to select the type of well log measurement to be included in the combined NMR analysis. The user interface may also allow the user to modify, replace or alter the program display, the program flow and the program source.

Figure 5:
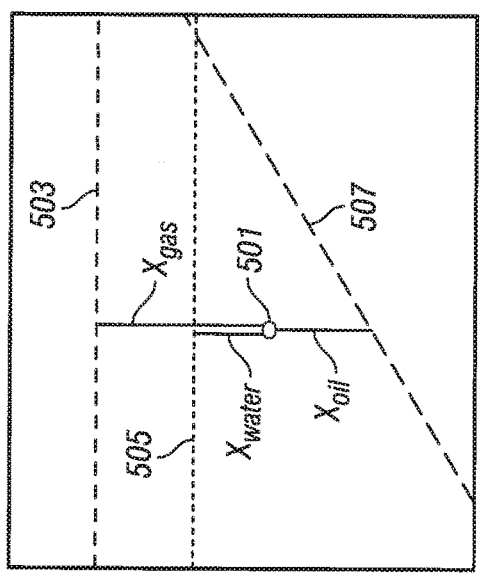
FIG. 5 is a D-$T_2$ map illustrating an example for determining well log coefficients.

Determination of the well log coefficients on a D-$T_2$ map is shown in FIG. 5. Each subcomponent in Equation set (9) represents a pixel value on the D-$T_2$ map. The D-$T_2$ map representation of the NMR data does not assume a fluid model, rather it provides a graphical representation of the NMR responses in the form of cross plots of NMR properties. U.S. Patent Application No. US2004/0169511 provides further information on D-$T_2$ maps. In the map 500 shown in FIG. 5, the horizontal axis is defined by a logarithm of $T_2$ values and the vertical axis is defined by a logarithm of diffusion values D. The point 501 represents a pixel on the row i and column j of the matrix representing the D-$T_2$ map. The theoretical responses of water 505, oil 507 and gas 503 are overlaid on the maps. Distances X wat, X oil and X gas are the distances of the point on the two dimensional map form the lines representing theoretical responses of water 505, oil 507 and gas 503 respectively. The well log coefficients may be determined by using the following set of equations:

$$\rho(T2_i, D_j) = \rho_{wat}\frac{(1/X_{wat})^2}{Z^2} + \rho_{oil}\frac{(1/X_{oil})^2}{Z^2} + \rho_{gas}\frac{(1/X_{gas})^2}{Z^2} \quad (11)$$

$$C^{1/m}(T2_i, D_j) = C_{wat}^{1/m}\frac{(1/X_{wat})^2}{Z^2}$$

$$HI(T2_i, D_j) = HI_{wat}\frac{(1/X_{wat})^2}{Z^2} + HI_{oil}\frac{(1/X_{oil})^2}{Z^2} + HI_{gas}\frac{(1/X_{gas})^2}{Z^2}$$

$$Z^2 = (1/X_{wat})^2 + (1/X_{oil})^2 + (1/X_{gas})^2$$

The coefficients (or end points) associated with each D-$T_2$ map can be computed as a weighted sums of the end points of the different fluids (water, oil and gas) present. The map itself can be divided up in several different ways. The embodiment shown in FIG. 5 is based on squared distances from theoretical fluid responses. Various other approaches may be used to arrive at values for the well log coefficients. For example, the value of Z may also be computed as the algebraic mean of the absolute distances of the point from the theoretical fluid responses.

Figure 6A:
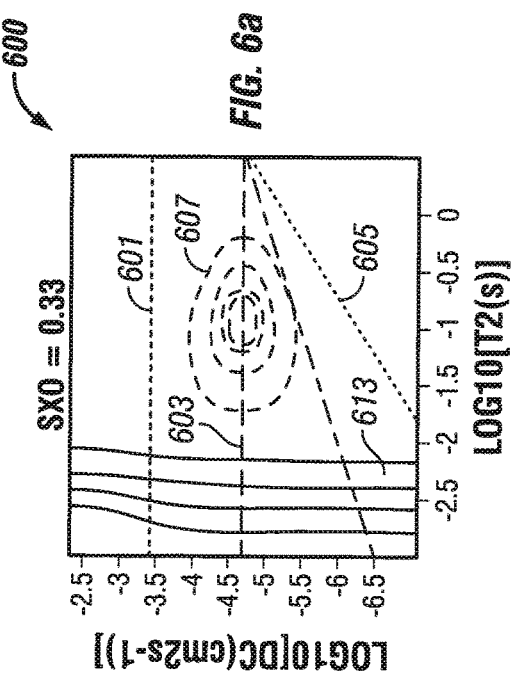
FIGS. 6a-6f are D-$T_2$ maps of non-NMR data.
Figure 6D:
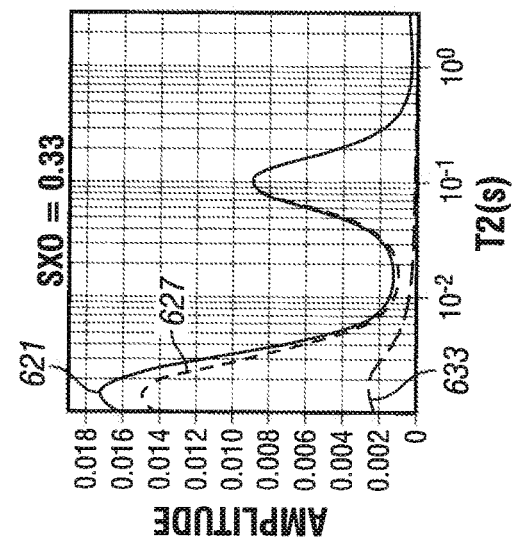
Figure 6C:
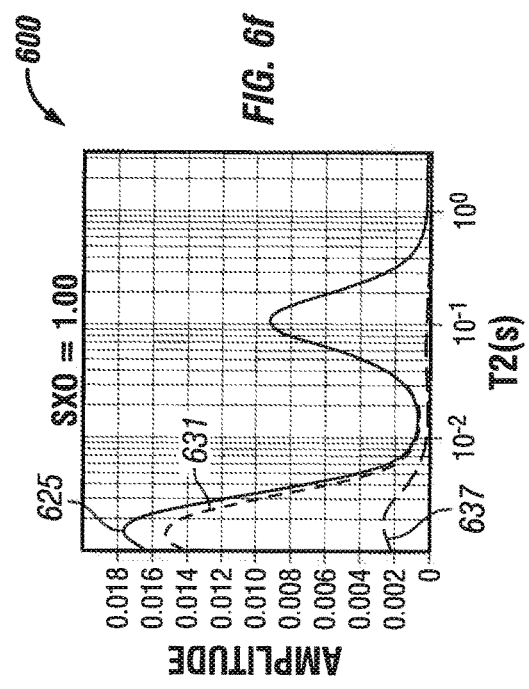
Figure 6B:
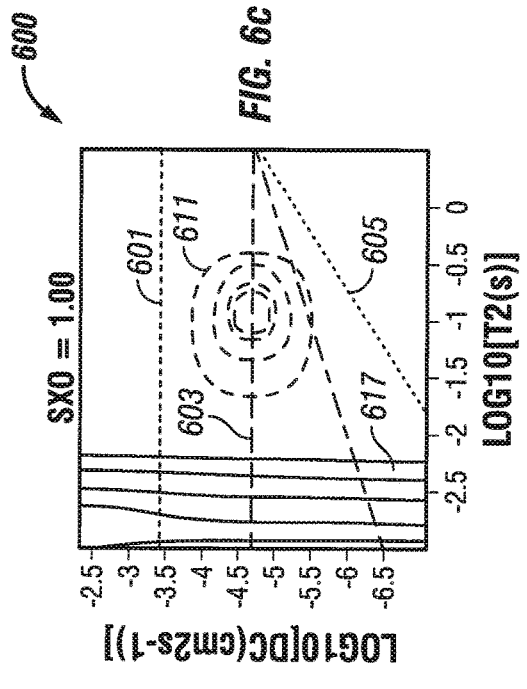
Figure 6F:
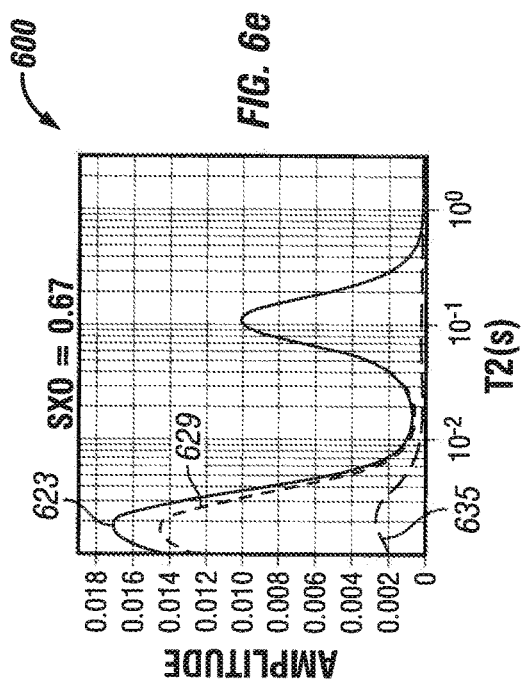
Figure 6E:
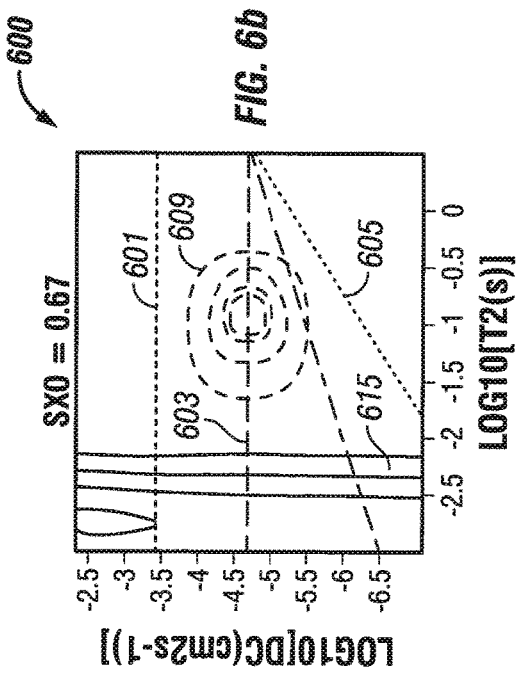

FIGS. 6a, 6b and 6c show D-$T_2$ maps obtained for a synthetic simulated data comprising heavy oil and water signal with water saturations of 0.33, 0.67 and 1.00 respectively. FIGS. 6d, 6e and 6f show inversion of the data represented in the D-$T_2$ maps shown in FIGS. 6a, 6b and 6c, respectively. These figures represent NMR analysis without including additional well log measurements. For example, NMR analysis of Equation set (4) may lead to similar results. Note that although the inversion method employed in the embodiment shown in FIG. 6 is 3D-NMR, other inversion methods, such as MRF, may also be used. The theoretical responses of gas water and oil are overlaid on the D-$T_2$ maps and are labeled as 601, 603 and 605, respectively. The inversion process converts the NMR data to $T_2$ distributions corresponding to each theoretical fluid response (for gas, water and oil, in this embodiment). For the water saturation value of 0.33, the $T_2$ distributions of gas, water and oil are labeled as 621, 627 and 633, respectively. Similarly, the $T_2$ distributions of gas, water and oil for a water saturation value of 0.67 are labeled as 623, 629 and 635, respectively. The $T_2$ distributions corresponding to gas, water and oil for maximum water saturation level of 1, are labeled as 625, 631 and 637, respectively.

The fluid instances 607, 609 and 611 lie on the theoretical water response line, and hence can be clearly identified as water. However, fluid instances 613, 615 and 617 show that for small values of $T_2$, the NMR data does not provide reliable information to classify the fluid as either gas, water or oil. In this particular example, the NMR analysis is unable to reliably discriminate between the heavy oil and small-pore/claybound water.

Figure 7A:
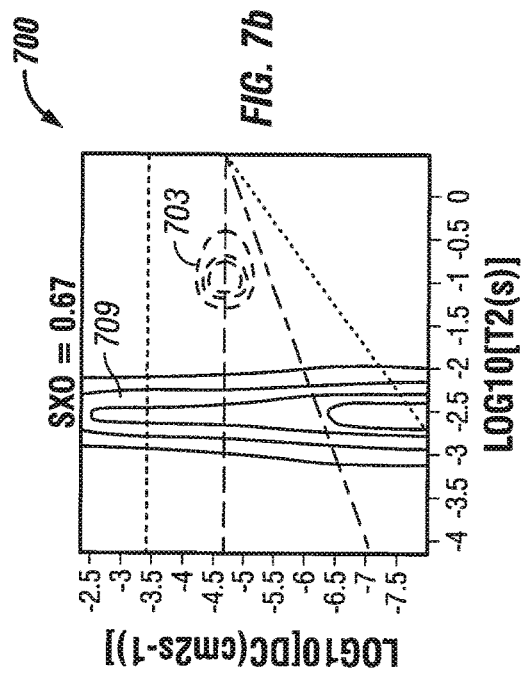
FIGS. 7a-7f are D-$T_2$ maps of NMR data combined with additional well log data in accordance with an example embodiment.
Figure 7B:
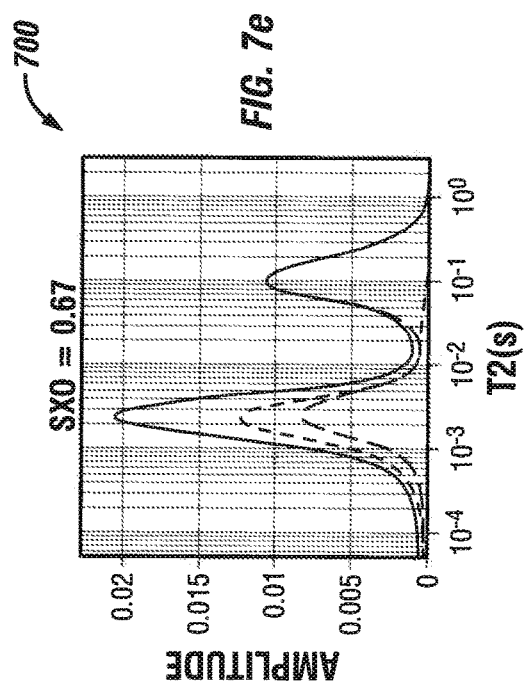
Figure 7D:
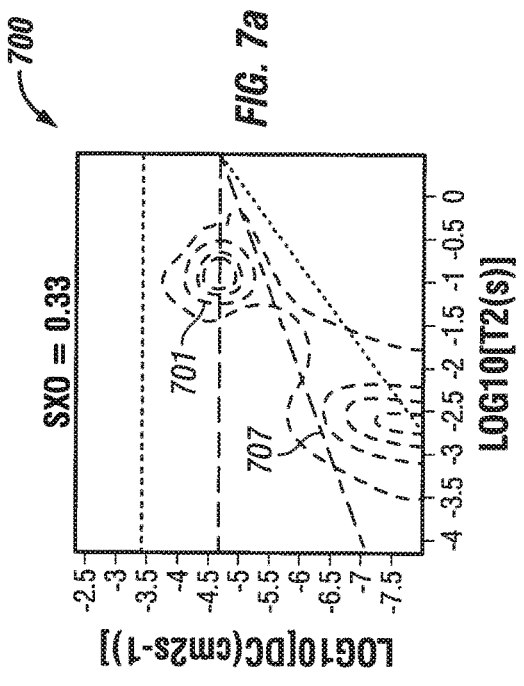
Figure 7E:
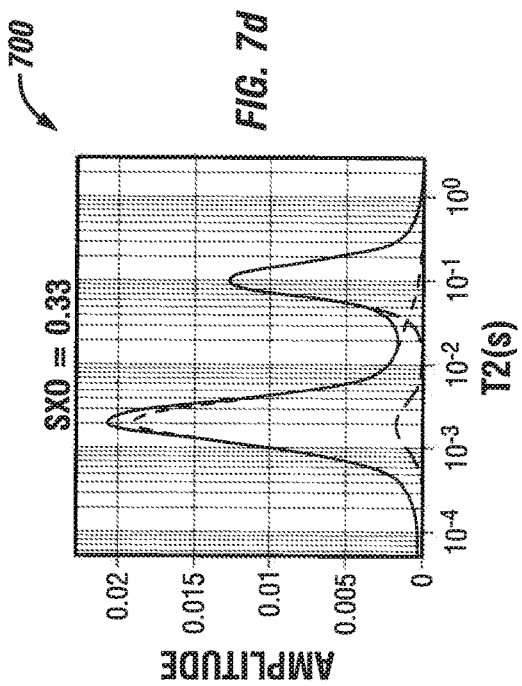
Figure 7C:
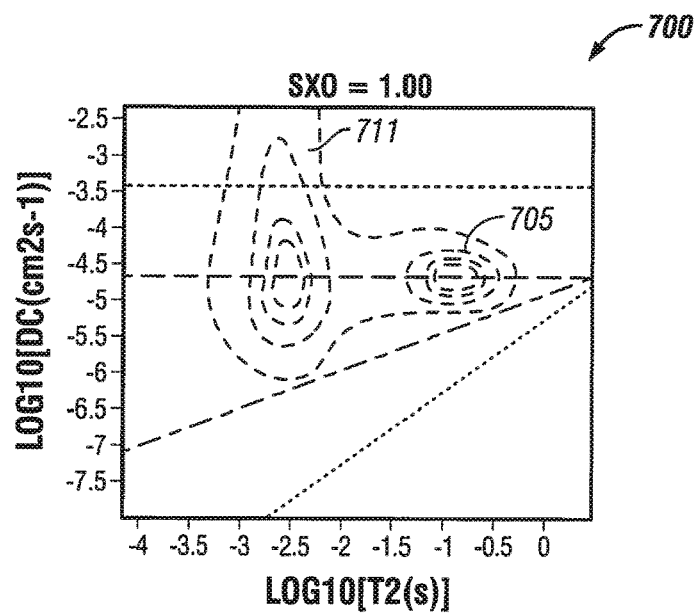
Figure 7F:
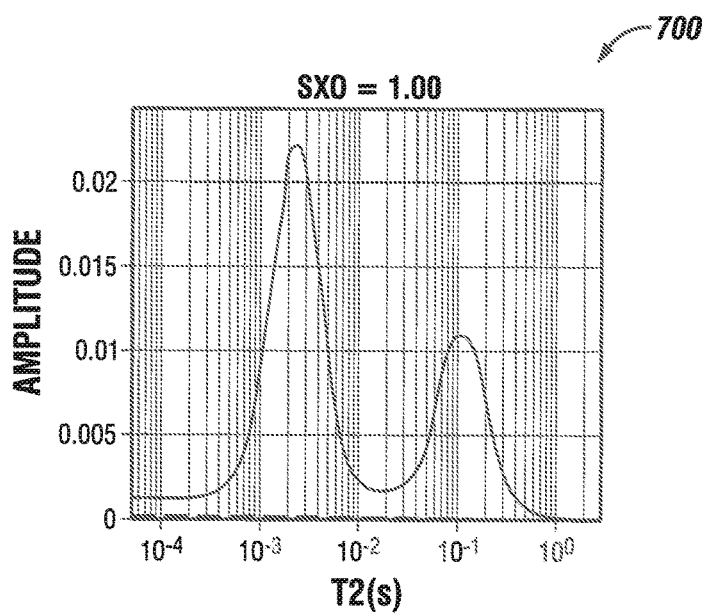
Figure 8:
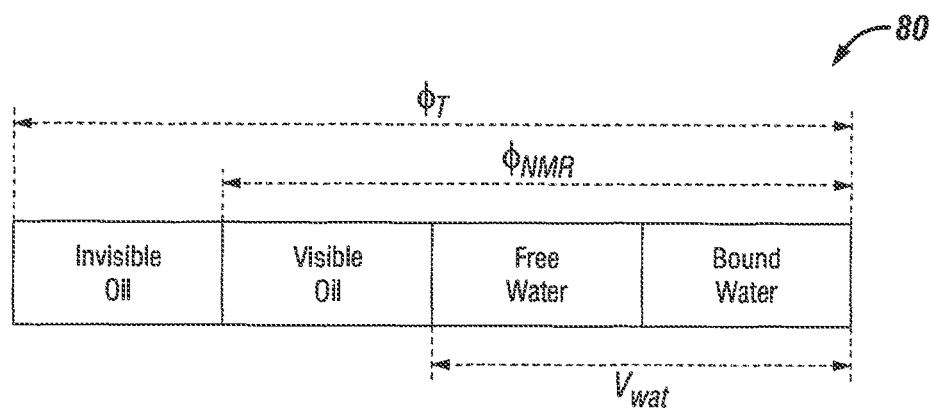
FIG. 8 is a schematic diagram shown relevant fluid volumes for heavy oil log analysis with NMR data.

FIGS. 7a-7c show the D-$T_2$ maps of the obtained for the same synthetic simulated data analyzed in FIG. 6a-6c. However, in this case a resistivity measurement and a density measurement were also included and the combined analysis method. The combined method may be obtained from the Equation set (9). Note that the inclusion of additional well log measurements enables the analysis to distinguish the water 711 and oil 707 signals reasonably well. The embodiment shown in FIGS. 7a-7f extends the range of viscosity estimate derived from the NMR data. This extended range may allow to distinguish fluid instances more effectively as compared to standard NMR analysis. For example, the combined analysis may be employed to investigate heavy oil reservoirs which the conventional NMR is unable to detect.

In some embodiments, a statistical approach may be used to derive results for the integration of NMR measurements with conventional log data. The use of a statistical approach may provide certain benefits, such as providing uncertainties on various outputs (e.g., viscosity). Additionally, the use of a statistical approach may allow for variation of model parameters, which are often the main source of overall error (as opposed to statistical measurement error).

As discussed above, for some embodiments, a goal of well log analysis is to determine the mineral and fluid volumes that constitute the Earth formation as a function of depth. This may be achieved by analyzing a plurality of well log measurements that have previously been acquired by logging tools. In general, the physical properties measured by the tools are not the fluid or mineral volumes themselves. However, each of the measurements is largely determined by (at least) a subset of the volumes. Well log analysis is then performed by first expressing each logging tool response in terms of the volumes and then computing the set of volumes that provide the overall best agreement between the computed tool responses and the actual measured log values.

For each tool, the physical properties submitted to the log analysis may be derived by pre-processing raw data such as count rates, voltage amplitudes, frequencies and signal phase differences. For NMR tools, the pre-processing stage involves calibration (in terms of NMR volume fractions) of echo amplitudes and the mathematical inversion of echo amplitude decays to provide $T_2$ (transverse relaxation time) distributions. The quantity eventually submitted to the multi-tool analysis is the NMR porosity, which is the sum of the amplitudes in the $T_2$ distribution. In some cases a NMR bound fluid volume, computed as the sum of $T_2$ distribution components falling below a specified $T_2$ cutoff value, is also input to the analysis. The NMR porosity and bound fluid volumes are related to the formation fluid volumes by the respective fluid hydrogen indices.

The approach described above makes an implicit assumption that the NMR responses of the fluids is known. In practice, this may not be the case. For example, when heavy oil is present in the formation, the contribution of the hydrocarbon to overall NMR response depends on the oil viscosity, which is generally not known. Furthermore, a typical analysis approach does not allow proper incorporation of multi-measurement NMR acquisitions where the response may be determined based upon molecular diffusion rates and ultimately fluid type. In effect, much of the fluid information included in the NMR data is abandoned and solely information contained in the $T_2$ distributions is extracted and propagated to subsequent (multi-tool) analysis. The full NMR dataset is then analyzed independently to compute any relevant fluids information. However, the reliability of the "stand-alone" NMR analysis depends heavily on the types of fluids present, and meaningful uncertainties on fluid properties as well as volumes may be difficult to determine. In some cases it is not possible to simultaneously determine both volumes and NMR responses (which define fluid properties) from the NMR data alone.

In some embodiments, such as some of the forgoing, the disclosure describes a method by which NMR data and conventional log data may be analyzed together simultaneously in a self-consistent manner, and provides answers that are consistent with the available log measurements. Example benefits of such embodiments are that it may provide uncertainty estimates for fluid properties and volumes and that is applicable to hydrocarbons with a wide range of properties, including very heavy oils which may generate little or no measurable NMR signal.

In some embodiments, NMR logs (including diffusion-based measurements) may be combined or integrated with conventional logs, such as dielectric dispersion logs and nuclear—and/or ELAN (elemental log analysis)—porosity logs. In example embodiments, outputs of inversions integrating these measurements may be a set of fluid volumes and viscosity values, together with associated uncertainties, that are consistent with the input data from multiple tools and with their respective radial responses.

Combining logs from different sensors may pose certain challenges. For example, it may be desirable to consider the depth of investigation of the measurements when combining dielectric logs with NMR logs. Both NMR and dielectric logs may have very specific measurement DOIs, and thus can be sensitive to (shallow) mud filtrate invasion. If the invasion and respective measurement DOIs are not properly included in an integration analysis, inconsistencies—and improper results—could be produced. Nonetheless, if the interpretation and measurement models are realistic and accurate, then the invasion effects can be beneficial for the interpretation, yielding more accurate results in certain embodiments.

The choice of production technologies for heavy oil reservoirs may be affected by robust determination of both hydrocarbon volume and viscosity. Lateral and vertical disposition of hydrocarbon as well as variations in oil properties are to be quantified along with their associated uncertainties for production strategies to be optimized.

In some embodiments, an approach may be used for the characterization of heavy oil reservoirs, integrating NMR with dielectric dispersion measurements and conventional nuclear porosity logs in a single self-consistent workflow which provides reliable fluid saturation and oil viscosity. The complementary information content and commensurate sensitive volumes of dielectric and NMR logging tools can make these measurements natural choices for heavy oil evaluation. Whereas conventional resistivity-based analysis may be challenged by fresh or variable salinity formation water encountered in many heavy oil reservoirs, dielectric logs in some embodiments can provide robust saturations even in fresh water environments.

Example methods for integrating dielectric logs with NMR logs may build on advances in NMR viscosity estimation techniques allowing accurate viscosity determination for crude oils with viscosities ranging from tens to millions of centipoise. NMR diffusion measurements as well as relaxation time distributions may be incorporated in the analysis, if available. Such methods may be valid for a NMR acquisition sequence, tool design or conveyance method and may ensure that radial and/or axial responses of the respective measurements are properly considered. Monte Carlo sampling can be used in some embodiments to derive uncertainties on fluid volumes and viscosities which can be fed in decision-making processes that rely on these quantities, as will be discussed further below. While in example embodiments, attention may be paid to the integration of Wireline NMR and dielectric measurements, the method is quite general and may be adapted to conventional resistivity measurements in place of dielectric logs and using LWD in place of Wireline logs.

Various approaches may be used for integrating NMR measurements with dielectric logs. For example, in one example method, a Monte Carlo grid may first be defined. This may involve determining oil parameters (e.g., viscosity, $T_1/T_2$ ratio, diffusion/$T_2$ ratio, hydrogen index), water parameters (e.g., surface relaxivity, $T_1/T_2$ ratio, hydrogen index), and invasion parameters (e.g., Ri). In some embodiments, this Monte Carlo grid may be based on approximately 500,000 samples, or any other suitable, user-definable number. Oil NMR response functions may be taken directly from a data base or defined according to a model which parameterizes the shape of oil $T_2$ distributions.

Computation of a measurement response for points on the grid may then be performed. This may include an NMR response for water based on water parameters, acquisition parameters, and depth of investigation (DOI). This may further include NMR responses based on oil parameters, acquisition parameters, and DOI. A sample may then be selected from the Monte Carlo grid. This may be done through a variety of selection methods, such as the metropolis sampling method. A full kernel or response matrix may then be computed.

Furthermore, the problem presented may be solved by the matrix, which may be a linear problem in example embodiments. The problem may utilize equations for NMR window sums, dielectric water volumes, and total porosity. The volumes may include water $T_2$ distribution components and oil volumes. The results may be saved by computing the chisq or error, computing oil viscosity and other properties (e.g. bound water volume) and adding these values to the running totals. Repeated iterations may be performed (e.g., 100-500 times, or any other suitable user-definable number). After the repetitions, the distribution of oil viscosities may be output.

Although much of the preceding paragraphs describe example embodiments integrating NMR measurements with dielectric log measurements with the specific application to heavy oil characterization, indeed the concepts of the preceding paragraphs may be used with other embodiments. For example, the use of statistical approaches (e.g., Monte Carlo) may be used to integrate NMR measurements with other conventional logs such as resistivity logs. Moreover, the integration of NMR with conventional logs (e.g., dielectric, resistivity, or other logs) may be used for other carbonate applications, such as determining pore size, geometry, and/or wettability.

The invention may also include a computer readable medium that stores a program which is executable by a processor and includes instructions for integrating NMR data with additional well log measurement of an investigation area. The computer readable medium may be, for example, a floppy disk, a hard disk drive, a optically readable medium, a flash memory, magnetic storage medium, etc.

Figure 17:
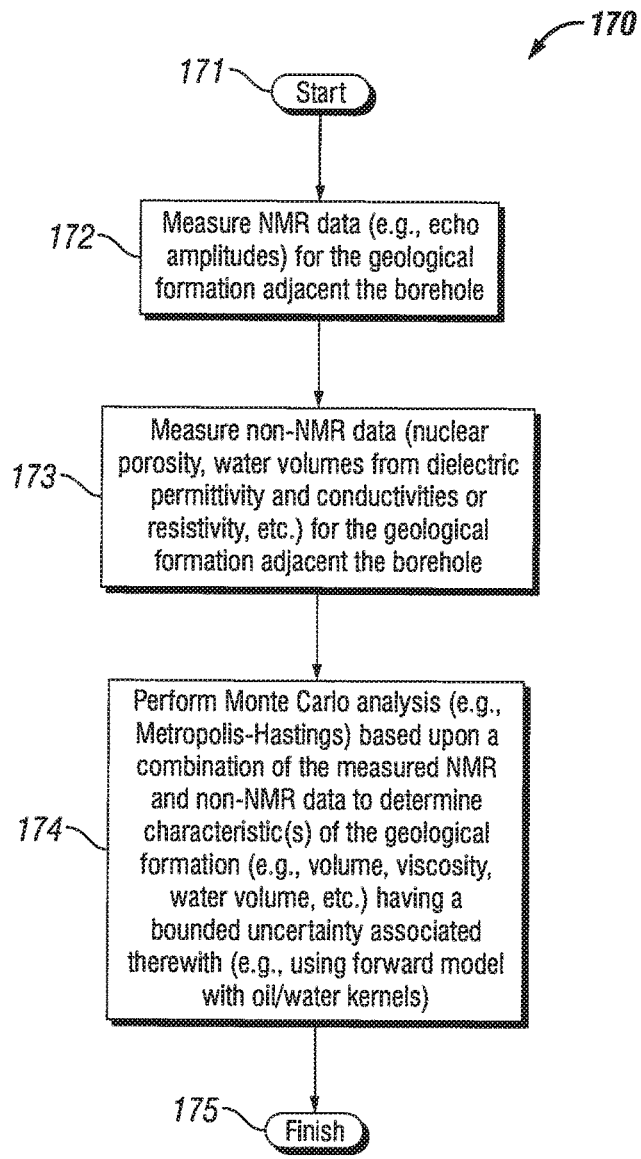
FIG. 17 is a flow diagram illustrating a statistical analysis method based upon combined NMR and non-NMR data in accordance with an example embodiment.

Turning now to FIG. 17, a statistical analysis method for determining at least one characteristic of a geological formation having a borehole therein is further described with reference to the slow diagram 170. Beginning at Block 171, the method includes collecting NMR data (e.g., echo amplitudes) for the geological formation adjacent the borehole, at Block 172, and collecting non-NMR data (e.g., dielectric dispersion, resistivity, nuclear measurement, sonic, ELAN analysis, etc.) for the geological formation adjacent the wellbore, at Block 173, as discussed further above. The method further illustratively includes performing a Monte Carlo analysis based upon a combination of the collected NMR and non-NMR data to determine the at least one characteristic (e.g., volume, viscosity, water volume, etc.) of the geological formation having a bounded uncertainty associated therewith, at Block 174, which illustratively concludes the method of FIG. 17 (Block 175). By way of example, the Monte Carlo analysis may be performed based upon a forward model using appropriate kernels for oil, water, etc., as will also be discussed further below.

Referring now additionally to FIGS. 8-16, the above-noted method integrating NMR and dielectric logs will now be further described with reference to characterization of heavy oil, although the approach described herein may be used for characterizing other elements within a geological formation as well. The choice of production technologies for heavy oil reservoirs depends on robust determination of both hydrocarbon volume and viscosity. Lateral and vertical disposition of hydrocarbon as well as variations in oil properties should be quantified along with their associated uncertainties for optimizing production strategies.

The example approach to the characterization of heavy oil reservoirs integrates NMR with dielectric dispersion measurements and nuclear porosity logs in a single self-consistent workflow that provides reliable fluid saturation and oil viscosity. The complementary information content and commensurate sensitive volumes of dielectric and NMR logging tools make these measurements good choices for heavy oil evaluation. Whereas typical resistivity-based analysis may be challenged by the fresh or variable salinity formation water in many heavy oil reservoirs, dielectric logs provide robust saturations even in fresh water environments.

The method may take advantage of advances in NMR viscosity estimation techniques that enable accurate viscosity determination for crude oils with viscosities ranging from tens to millions of centipoise. NMR diffusion measurements as well as relaxation time distributions may be incorporated in the analysis. The method is valid for any NMR acquisition sequence, tool design, or conveyance method and ensures that radial as well as axial responses of the respective measurements are properly considered. Monte Carlo sampling is used to derive uncertainties on fluid volumes and viscosities, which can be fed in decision-making processes that rely on these quantities. Although particular attention is paid to the integration of wireline NMR, and dielectric measurements, the method may more generally be adapted to resistivity measurements in place of dielectric logs and LWD (or other methods of conveyance) in place of wireline logs. The following examples are presented to demonstrate the application of the method in a range of very different heavy oil reservoirs. Results are compared with core and fluid sample measurements where available.

By way of background, viscosity is a factor in defining production strategies in reservoirs including heavy oil. For example, the viability of water flooding depends on the relative mobility of the oil phase, which is governed by viscosity. Similarly, evaluation of economic factors associated with thermal production methods may involve knowledge of oil viscosity as well as net volume and distribution. In some areas, notably in certain carbonate reservoirs, the location and characterization of tar or bitumen play a role in field development. Tar mats may act as an impediment to fluid movement, and it may be a factor when designing injectors. Definitions of heavy oil vary from region to region, and even between practitioners of different disciplines. As used herein, "heavy oil" is intended to include any hydrocarbon with a viscosity above about 10 cp at reservoir conditions. However, as noted above, the techniques set forth herein may be used with oils of different viscosity ranges, and with other materials as well.

Borehole logging offers a cost effective and practical solution for identifying and characterizing heavy oil. Nonetheless, the log analysis of heavy oil reservoirs may be very challenging using typical triple-combo logs. Moreover, typical logging does not provide information about viscosity. For this, nuclear magnetic resonance (NMR) logs are sometimes used. Several transforms have been developed relating NMR relaxation times to fluid viscosity. The correlations relate to either $T_2$ or $T_1$ measurements. However, in practice, $T_2$ is most commonly used, and for clarity of explanation the following examples will be primarily described with respect to $T_2$ distributions. Provided that the NMR signature of the oil may be reliably identified in the $T_2$ distribution, it is then straightforward to compute a mean geometric mean $T_2$ ($T_{2LM}$) for the oil signal, apply one of the transforms and derive a viscosity estimate.

Two main factors may reduce the validity of the simple $T_2$ correlation approach. First, distinguishing between water and oil signals in the NMR distributions may not be possible if the signals are overlapping. Although multi-dimensional diffusion NMR measurements may be used to separate water and oil signals, these techniques may not extend to oils with viscosity above about 200 cp. For these heavier oils, including tar and bitumen, the log analyst defines cutoffs in the T2 distributions to delineate the two fluid phases. The selection of cutoff inevitably introduces uncertainty into the analysis, which may be difficult to quantify. The second factor applies to very heavy oils, such as tar and bitumen. These hydrocarbons have NMR responses which decay quickly such that NMR logging tools may not be able to capture the full signal. This translates into an underestimation of porosity and overestimation of oil $T_{2LM}$. As a result, viscosity transforms based solely on $T_2$ correlations become unreliable at high viscosities.

Difficulties of $T_2$-based correlations were recognized early on by others in the art who proposed viscosity algorithms specifically for heavy oil based on the NMR apparent hydrogen index. More general expressions were later developed which explicitly incorporate both $T_2$ and hydrogen index. These transforms have been shown to give reliable results over a broad range of viscosity. They utilize a measurement of either relative hydrogen index or apparent hydrogen index. For logging applications it is convenient to use the apparent oil hydrogen index ($HI_{app}$), which can be defined operationally as $$HI_{app} = \frac{\Phi_{NMR} - v_{wat}}{\Phi - v_{wat}} \quad (12)$$

where $\Phi$ is the total porosity, $\Phi_{NMR}$ is the NMR porosity and $v_{wat}$ is the water volume. A schematic representation 80 showing the relevant fluid volumes for heavy oil log analysis with NMR data is provided in FIG. 8.

An added complication of the hydrogen index approach is that the NMR porosity itself, $\Phi_{NMR}$, depends on several acquisition and processing parameters. One of these is the echo spacing (TE), but wait times and the number of repetitions (for burst measurements) also play a role. Processing parameters such as minimum $T_2$ and regularization may also affect the computed $\Phi_{NMR}$ value. In practice, these parameters may be dictated by signal-to-noise considerations. In principle, specific transforms could be developed for each configuration of acquisition and processing parameters. In fact, acquisition dependency has been incorporated explicitly in some cases. However, new generation NMR logging tools now employ a wide range of different acquisition sequences, each of which has a specific response to short $T_2$ components. While the variability of acquisition and processing does not necessarily preclude measurement of the hydrogen index, and by implication viscosity, it does place a restriction on the global accuracy and precision of the approach, which is difficult to quantify.

Transforms based on $T_2$ and HI may utilize independent measurements of total porosity and fluid saturations. Several authors have proposed interpretation workflows for heavy oil which explicitly combine multiple sensors to estimate the desired quantities. Porosity may be provided by nuclear measurements, while fluid saturations are derived from resistivity logs. These quantities are then combined with the volumes determined from the NMR $T_2$ distributions.

Because many heavy oil reservoirs are relatively shallow, formation water is often fresh, leading to low resistivity contrast. In these environments, resistivity interpretation may be challenging. Another measurement which is well suited to this problem is the dielectric log. New generation dielectric dispersion logging tools provide reliable water saturations even in fresh conditions. Applications of dielectric measurements to the characterization of heavy oil reservoirs have been discussed in several articles. The combination of dielectric dispersion and NMR logs may be used for heavy oil evaluation. The information content of the two logs is entirely complementary for purposes of fluid quantification and characterization. Equally significantly, the respective measurement volumes are commensurate, both NMR and dielectric sensors having depths of investigation in the 1-4 inch range. The two measurements also have the potential to perform radial profiling and are sensitive to shallow invasion, a common scenario in wells drilled through formations containing heavy oil. For intermediate viscosity oils, NMR diffusion measurements may also help distinguish fluid components in fresh water environments.

In accordance with an example embodiment, a method is provided for heavy oil analysis. The method may addresses drawbacks of sequential analysis workflows, for example. Some benefits of the proposed method may include:
  a) combines NMR, dielectric, resistivity and nuclear measurements in a single, self-consistent and simultaneous inversion;
  b) honors the different radial responses log measurements;
  c) incorporates diffusion NMR measurements, if available, to better define oil signature and fluid volumes; and
  d) employs a statistical inversion method to provide realistic uncertainty estimates on derived answers, including viscosity.

The method may draw upon the concepts discussed above and may employ the same viscosity transforms.

Petrophysical log analysis may use forward models to relate measured log quantities to formation volumes. Linear log responses may be defined in terms of fractional volumes, $$L = \Sigma R_{log} \cdot v \tag{13}$$

In Equation 13, L and v are vectors containing the measured logs and the formation volumes respectively, and $R_{log}$ is the response matrix describing the contribution of each volume to the individual logs. The response matrix elements are defined by the measurement physics of each sensor, including axial and radial responses. The volumes are defined by the formation model. An additional equation may be included constraining the sum of volumes to be equal to 1.

A reduced problem may also be defined in terms of fluid components. It is instructive to consider a specific scenario in which NMR porosity, MRP, a water filled porosity, PHIW, and total porosity, PHIT, are available. The problem may be formulated as $$PHIT = v_{wat} + v_{oil\_vis} + v_{oil\_inv}$$

$$PHIW = v_{wat} \tag{14}$$

$$MRP = HI_{wat} v_{wat} + HI_{oil} v_{oil\_vis}$$

Here, $v_{oil\_vis}$ refers to the part of the oil signal detected by the NMR measurement while and $v_{oil\_inv}$ oil volume which is not captured by the NMR measurement, due to its fast transverse relaxation. This volume may be omitted when dealing with light and intermediate viscosity oils but may be included for heavy oils. The hydrogen indices of water and oil are $HI_{wat}$ and $HI_{oil}$. For the sake of generality, the origin of the PHIW and PHIT logs is not specified herein.

However, it is possible to replace these with specific log measurements. For example, density ($\rho$) and shallow conductivity ($C_{xo}$) logs may be inserted:

$$\rho - \rho_m = \rho_{wat} V_{wat} + \rho_{oil} V_{oil} - \rho_m \varphi$$

$$C_{xo}^{1/m} = C_{mf}^{1/m} \cdot v_{wat} \tag{15}$$

where $C_{mf}$ is the mud filtrate conductivity, m corresponds to an Archie cementation exponent, and $V_{wat}$ and $V_{oil}$ are water and oil volumes. Equations 14 include three volumes and three independent measurements and the solution is of course straightforward. However, this does not provide any insight into the oil viscosity or bound water volume, which are factors in determining fluid mobility and producibility.

With respect to NMR inversion, there are various published methods to perform the inversion. These inversions perform an inverse Laplace transform to generate probability distributions (e.g., $T_2$ distributions) from echo amplitudes. However, the underlying problem includes a system of simultaneous linear equations whose solution is a set of fluid volumes.

$$A = \Sigma K_{nmr} \cdot HI \cdot Dist \tag{16}$$

Here, the A vector includes measured echo amplitudes, HI refers to the true (i.e., not apparent) hydrogen index and $K_{nmr}$ is the NMR response kernel. In the simplest case, Dist, is a simple $T_2$ distribution. However, if the acquisition includes multiple wait-times and/or echo spacings, the distribution may expand over $T_1$ and diffusion dimensions. In practice it is often expedient to compress NMR echo data into window sums (ref. Freedman '308) or other linear combinations. The A vector then includes the compressed data and the kernel is redefined accordingly. The right hand side of Equation 16 may be decomposed into specific fluid contributions, $$A = HI_{wat} K_{nmr}^{(wat)} \cdot Dist_{wat} + HI_{oil} K_{nmr}^{(oil)} \cdot Dist_{oil} \tag{17}$$

Separate independent distributions, $Dist_{wat}$ and $Dist_{oil}$, now describe the water and oil fractions, and separate NMR kernels are assigned to the fluids. These kernels will, in general, be different for the two fluids due to their different intrinsic properties, notably $T_1/T_2$ and diffusion. Equation 17 forms the basis of NMR fluid characterization methods, which adopt specific forms for the NMR kernels.

It is possible to combine the NMR response (Equation 17) with the petrophysical logs (Equations 14) to obtain a single consistent model, namely $$PHIT = HI_{wat} \sum_i Dist(i) + HI_{oil} \sum_i Dist_{oil}(i) \tag{18}$$

$$PHIW = HI_{wat} \sum_i Dist_{wat}(i)$$

-continued $$A(j) = HI_{wat} \sum_i K_{nmr}^{(wat)}(j,i) Dist_{wat}(i) + HI_{oil} \sum_i K_{nmr}^{(oil)}(j,i) Dist_{oil}(i).$$

Figure 9:
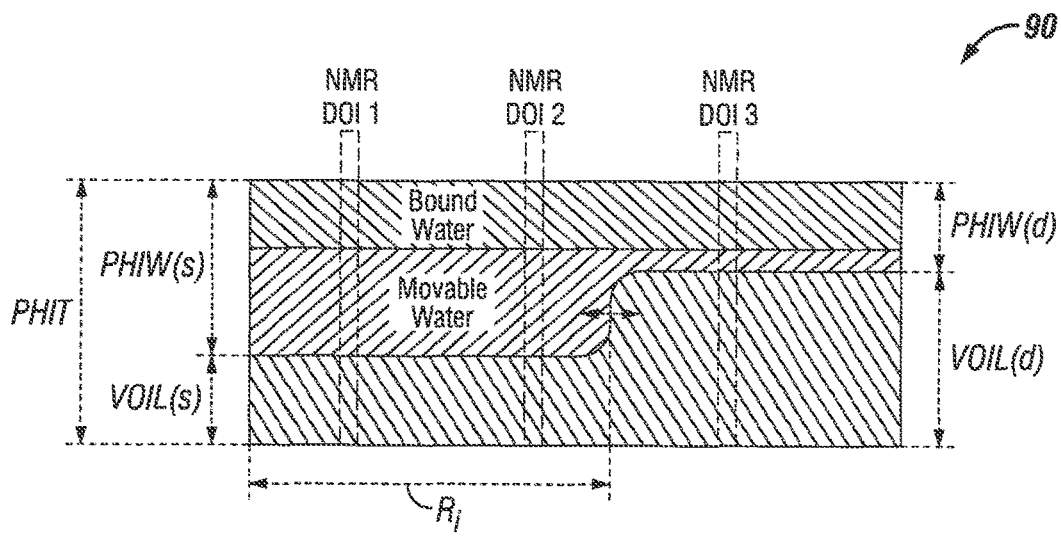
FIG. 9 is a schematic diagram of a formation fluid model, shallow (s) and deep (d) water and oil volumes.

To maintain consistency, combined logs may have commensurate sensitive volumes. Both NMR and dielectric dispersion logs have shallow relatively depths of investigation. Furthermore, these measurements also allow radial profiling over the near wellbore region and are therefore sensitive to shallow invasion. Multi-frequency NMR tools acquire independent measurements at well-defined depths-of-investigation (DOI) from 1-4 inches into the formation, each NMR shell having a radial thickness of a few mm. New generation dielectric tools acquire measurements at multiple frequencies and with multiple transmitter-receiver spacings. Analysis of the measurements yields conductivity and permittivity as a function of frequency, which are then interpreted in terms of water volume and salinity. Where shallow invasion is present, water volumes may be determined for two distinct regions, shallow (s) and deep (d), defined by a radial profile function and an invasion boundary, $R_i$, which is also an output of the processing. A schematic of a formation model 90 with NMR sensitive regions and water volumes from dielectric dispersion analysis is shown in FIG. 9, in which examples of different depths of investigation (DOI) of NMR measurements are shown as well as the invasion depth, Ri, derived from dielectric dispersion analysis.

According to the formulation of Equation 18, a water volume log may be used at each NMR DOI. These may be computed from the dielectric water filled porosity logs using a function:

$$PHIW(r) = g_R(r,R_i) \cdot PHIW(s) + (1 - g_R(r,R_i)) \cdot PHIW(d) \quad (19)$$

The radial function, $g_R$, may have values between 0 and 1 for radial distances, r, and may approach 1 for $r \ll R_i$ and approach 0 for $r \gg R_i$. One general form of taper function which satisfies these parameters is $$g_R(r, R_i) = \frac{e^{k(R_i - r)}}{e^{k(R_i - r)} + e^{k(r - R_i)}} \quad (20)$$

where k is a user-defined parameter which determines the sharpness of the taper function.

The forward models outlined above integrate raw NMR echo measurements with water volume and total porosity logs. Although the models implemented here focus on fluids, the method may be extended to include matrix properties from other appropriate petrophysical log measurements as well.

In the model described by Equation 18, separate kernels for water and oil are defined. Forms for the two kernels are $$K_{nmr}^{(wat)}(j,i) = \quad (21)$$

$$NR_j^{1/2}\left(1 - \exp\left(\frac{-WT_j}{\theta_{wat} T_2(i)}\right)\right) \times \exp\left(-n_j TE_j\left(\frac{D_{wat} TE_j^2 G^2}{12} + \frac{1}{T_2(i)}\right)\right)$$

$$K_{nmr}^{(oil)}(j,i) = NR_j^{1/2}\left(1 - \exp\left(\frac{-WT_j}{\theta_{oil} T_2(i)}\right)\right) \times$$

$$\exp\left(-n_j TE_j\left(\frac{\beta T_2(i) TE_j^2 G^2}{12} + \frac{1}{T_2(i)}\right)\right)$$

The kernel parameters are as follows:
$\theta_{wat}$ $T_1/T_2$ for water
$\theta_{oil}$ $T_1/T_2$ for oil
$D_{wat}$ water diffusion constant
$\beta$ $D/T_2$ for oil (D=diffusion constant)
$WT_j$ wait time associated with echo j
$TE_j$ echo spacing associated with echo j
$NR_j$ number of repeats associated with echo j
$n_j$ echo number of echo j
G magnetic field gradient (depends on DOI)
$T_2(i)$ ith $T_2$ value The kernels in Equation 21 refer to conventional CPMG echo train measurements. For diffusion editing acquisition sequences, small modifications may be implemented. Also, the simplified polarization terms in Equation 21 assume 100% repolarization based on wait times. These may be replaced by specific polarization functions depending on tool geometry and logging speed. In addition to the NMR response kernels, the model described by Equations 18 also uses the fluid hydrogen indices, $HI_{wat}$ and $HI_{oil}$.

NMR processing workflows may use non-linear optimization to solve Equation 17. Pre-defined values are input for the model parameters (H, $\theta_{wat}$, $\theta_{oil}$, $D_{wat}$, $\beta$, $HI_{oil}$) and answers are then obtained for the water and oil $T_2$ distributions. This approach works well provided that the parameters are accurately known and that the NMR data alone contains sufficient information to resolve separate distributions for water and oil. However, these conditions may not be satisfied in heavy oil environments.

Statistical inversion offers another approach to conventional optimization methods. Monte Carlo analysis of NMR relaxation measurements has recently been reported by certain authors. In those studies, NMR distribution amplitudes constitute the Monte Carlo parameters, which are randomly varied to yield multiple distributions consistent with measured echo data, and ultimately providing statistical uncertainty bounds on NMR answers. The method set forth herein also applies a Monte Carlo scheme, but adopts a different approach. In this case, the Monte Carlo variables include the total porosity, $\Phi_T$, water volume, $\Phi_W$, with input probability distributions defined by the measured PHIT and PHIW logs, and the invasion parameter, H, also defined by measured log data, if available. Other variables may include the fluid hydrogen indices, $HI_{wat}$ and $HI_{oil}$ and the NMR response parameters $\theta_{wat}$, $\theta_{oil}$, $D_{wat}$, and $\beta$. Also introduced are new variables which define the form of the oil $T_2$ distribution. This may help to ensure that oil $T_2$ distributions are realistic and mimic known responses for crude oils. The model assumes that oil $T_2$ distributions may be represented by three parameters: a logarithmic mean $T_2$ ($T2_{oil}$), a log-Gaussian width ($G2_{oil}$) and an asymmetry parameter ($AX_{oil}$). Examples of model oil $T_2$ distributions are presented in a graph 1000 in FIG. 10. Other applicable models may also be used for oil distributions. However, the one presented here is straightforward to implement and provides a reasonable representation of crude oil distributions over a broad range of viscosities.

Figure 11:
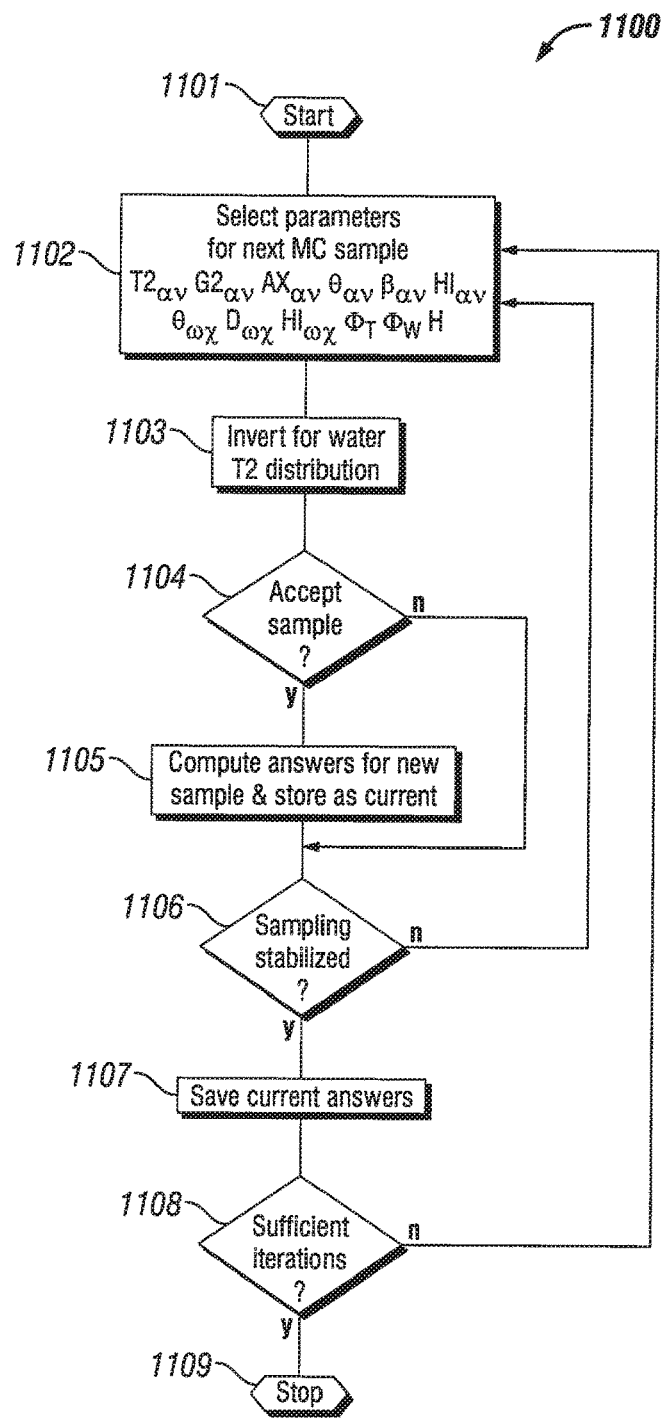
FIG. 11 is a flow diagram illustrating a Monte Carlo workflow for a heavy oil analysis in accordance with an example embodiment.

Referring additionally to the flow diagram 1100 of FIG. 11, the proposed Monte Carlo method iterates on each of the model variables, including the oil distribution parameters. At each iteration, the water $T_2$ distribution is determined using a non-linear optimizer, with an added constraint that the sum of amplitudes is equal to $\Phi_W$. If the NMR data includes measurements at multiple frequencies, an additional constraint may be added to ensure that bound water volume is invariant to DOI. The probability of each iteration (and that of its corresponding set of parameters and any derived answers) is given by the fit quality of the reconstructed data. A Metropolis-Hastings scheme may used to enhance sampling efficiency, which may be a challenge for other Monte Carlo workflows. This technique was originally developed for statistical thermodynamics applications, but has been applied in other contexts including petrophysical log analysis and NMR log inversion. In the Monte Carlo workflow illustrated in FIG. 11, efficiency of the sampling scheme may governed by the sample selection criteria. In particular, the step sizes determining the change in each parameter value between successive sample iterations may be optimized. It is also be desirable to define suitable stabilization criteria, to help ensure that the final answers include statistically relevant samples. Further optimization may be achieved by creating database of oil NMR responses with associated viscosities at initialization. Another database of water NMR kernels may also be generated. These databases may be generated once for an entire log. Distributions of parameters defining the respective database entries may cover the actual ranges encountered for the corresponding properties. During Monte Carlo sampling, it may then be desirable to pick the appropriate response function and kernel from the respective databases according to the parameters selected at each iteration.

In the illustrated example, beginning at Block 1101, the various parameters for a next Monte Carlo sample are selected, at Block 1102, followed by an inversion for water $T_2$ distribution (Block 1103). If the sample is acceptable, at Block 1104, then answers for the sample are determined and stored as the current sample, at Block 1105, at which point it may be determined if the sampling is stabilized (Block 1106). If so, the current answers may be saved, at Block 1007, and if sufficient iterations have been performed, at Block 1108, the method illustratively concludes at Block 1109.

In the present example involving heavy oil viscosity, the following viscosity transform may be adopted:

$$\eta = \frac{e^a}{T_2^* e^{b \cdot HI^*}} \quad (22)$$

Here, the $T_2^*$ and $HI^*$ are mean transverse relaxation times and apparent (NMR) hydrogen indices respectively. They are defined operationally either in the time (i.e., echo) domain or in the $T_2$ domain. Whichever method is adopted, the correlation parameters, a and b, may be derived by fitting NMR measurements (echo decays or $T_2$ distributions) for a set of crude oil samples. Ideally, desired parameters would be obtained for oils associated with a particular field. However, if this is not feasible, default values for the parameters may be used. The constants a and b were obtained from an analysis of NMR $T_2$ and viscosity measurements for a set of 14 different dead crude oil sample at five temperatures between 10° C. and 115° C. It was noted that dissolved gas has a pronounced effect on both oil viscosity and $T_2$. However, the effects are found to be consistent with typical viscosity-$T_2$ correlations as dead oils. Although hydrogen index will also be affected by dissolved gas, at least for low gas-oil ratios (GOR) it is estimated that Equation 22 will provide a good representation of oil viscosity.

Viscosity probability distributions were obtained using the Monte Carlo approach for the set of heavy oil samples. The NMR-based viscosity distributions are compared with measured viscosities in a map 1200 of FIG. 12. Here, the viscosity probability distributions for crude oil samples were computed from laboratory NMR data, in which the points 1201 represent measured sample viscosities.

Figure 12:
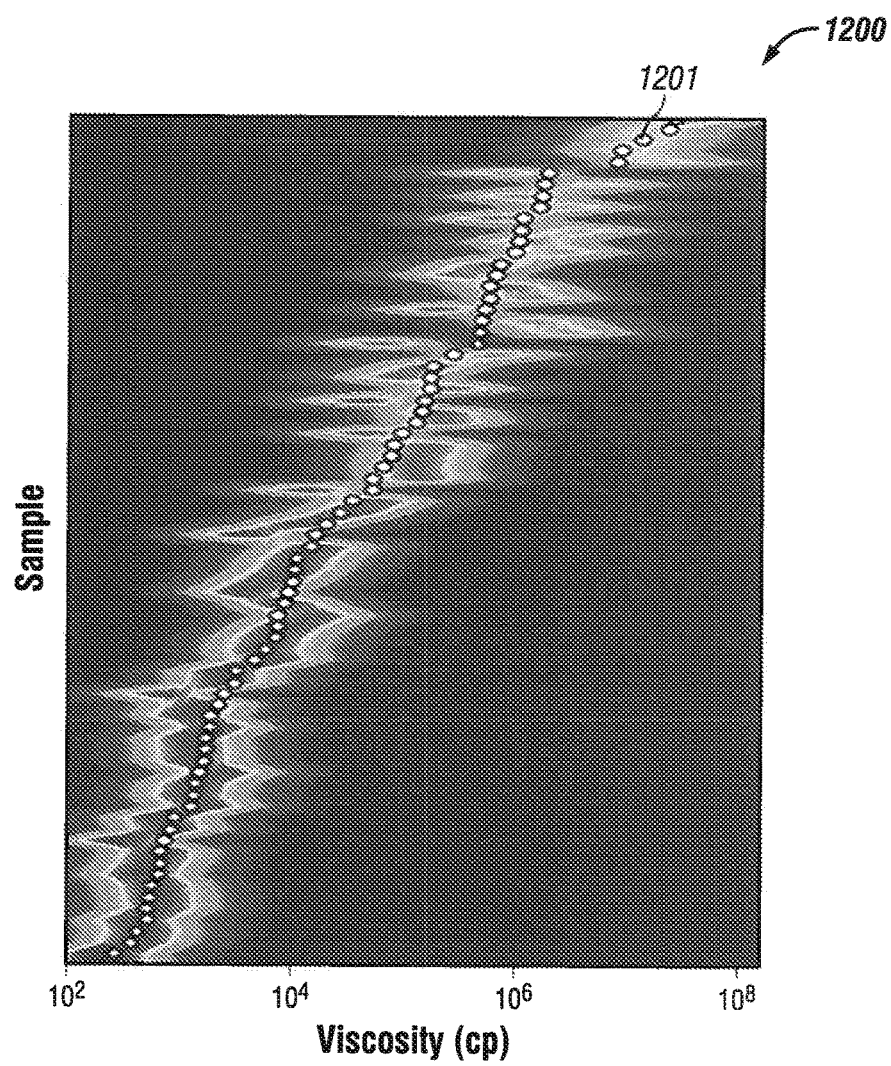
FIG. 12 is a map of viscosity probability distributions for crude oil samples computed from laboratory NMR data using the Monte Carlo approach of FIG. 11.

The results illustrated in FIG. 12 demonstrate that the computed viscosity probability distributions account for viscosity variations in heavy oils over almost six orders of magnitude. Although notably increased scatter is observed at higher viscosities, with the exception that two samples (out of 76) fall in the 95% confidence interval of the corresponding probability distributions.

Examples will now be provided which illustrate the benefits of the above-described Monte Carlo approach. The examples include both multi-frequency and single frequency NMR logs in combination with dielectric dispersion logs and porosity logs from nuclear measurements. In each case, the wells were drilled with water based mud. The oil types range over 5 orders of magnitude in viscosity from bitumen to intermediate viscosity oil.

Figure 13:
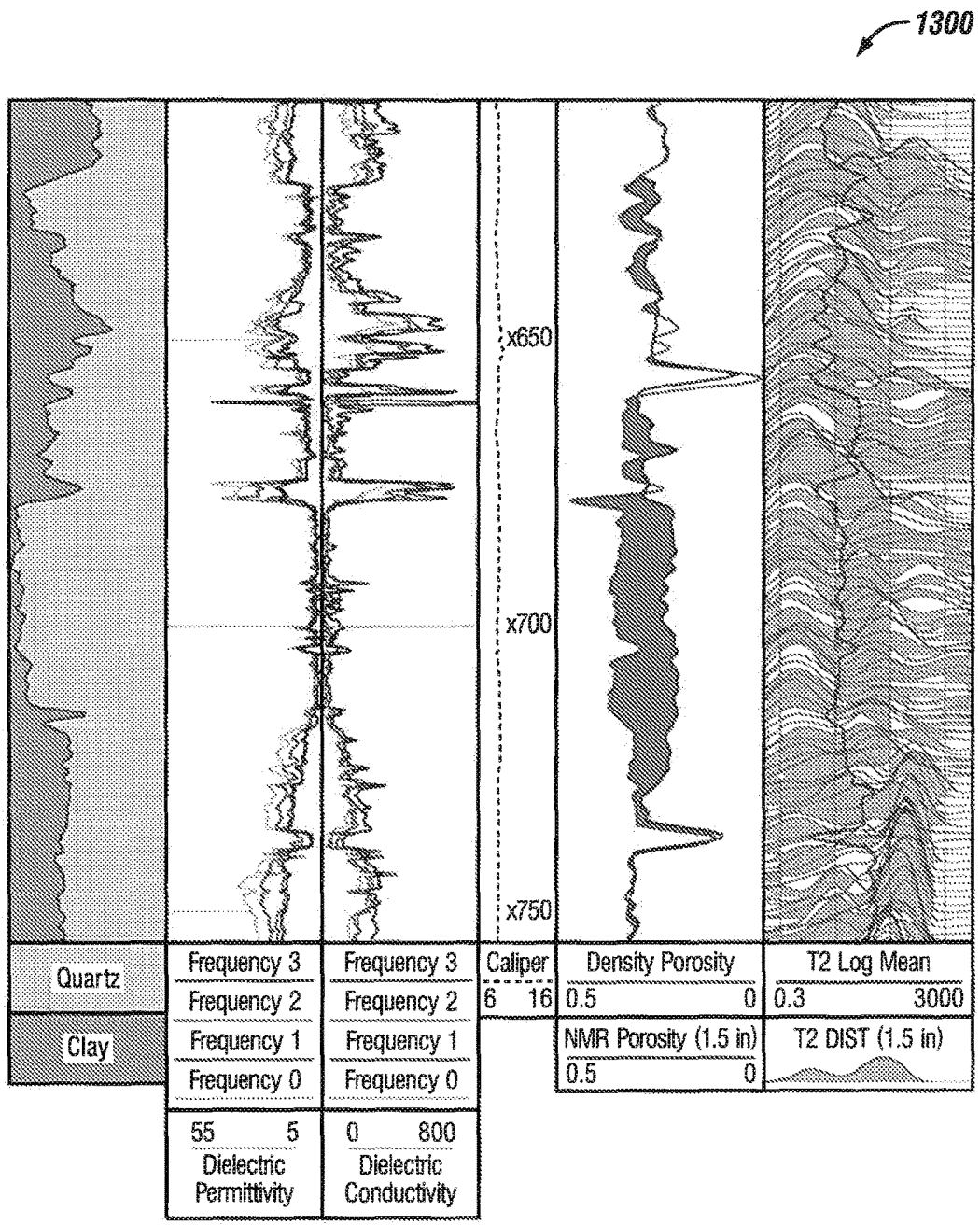
FIG. 13 is a series of plots of field log data from first example well drilled through a shaly sand formation including heavy oil and bitumen.

The first experimental example was from a well in Canada drilled through a formation in a field known to have highly variable hydrocarbon types, ranging from bitumen to viscous heavy oil. Since understanding the oil characteristics and viscosity gradient across the interval is desirable for well completion design, a dielectric dispersion tool and a single frequency NMR tool were run along with standard triple combo measurements. Field logs plots 1300 for the well are shown in FIG. 13.

More particularly, track 1 presents a simplified lithology showing sand and shale fractions derived from conventional nuclear logs. Tracks 2 and 3 present the dielectric permittivity and conductivity logs. Track 4 (right of depth track) compares density porosity ($\rho_m$=2.65 g/cc) and NMR porosity logs. The NMR $T_2$ distribution is plotted in track 5. A brief inspection of FIG. 13 identifies distinct intervals according to the NMR porosity deficit. Below ~x740, NMR and density porosities match, indicating either 100% water saturation or the presence of a lower viscosity oil. Between ~x730 and x680 there is a significant deficit in the NMR porosity, consistent with a very heavy oil or bitumen. Just above the shale break at ~680, a short interval where a smaller but significant NMR porosity deficit appears. The deficit reduces further above this and disappears completely at the top of the logged interval. It is not possible to make quantitative judgments regarding oil type based merely on visual inspection. However, it should be noted that such large variations in porosity deficit are broadly consistent with a variable viscosity.

Figure 10:
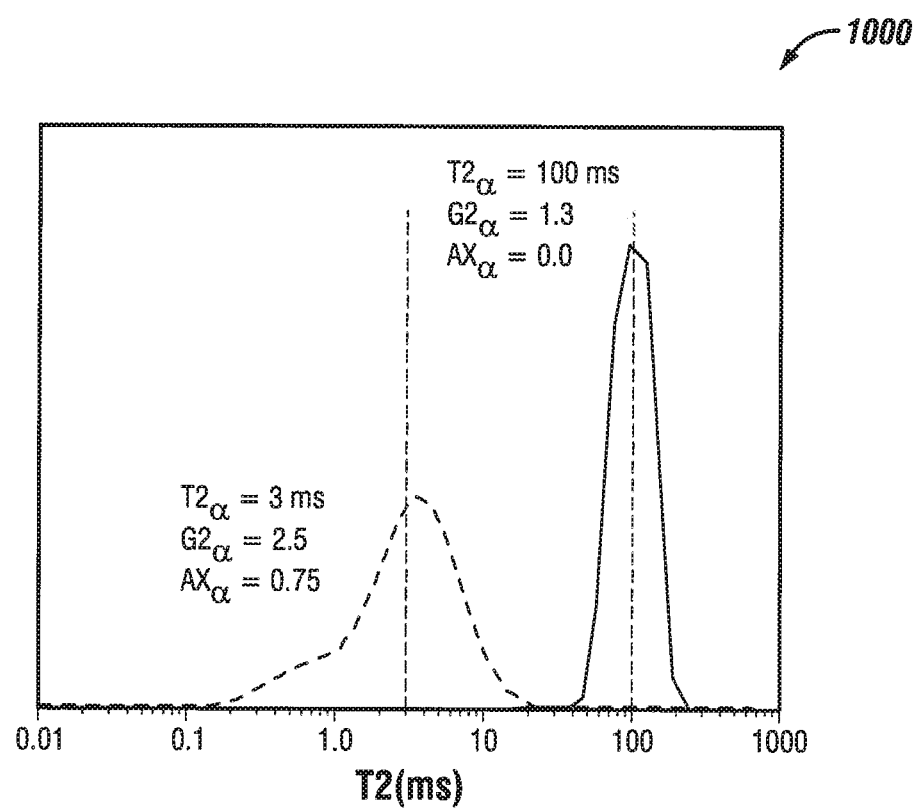
FIG. 10 is a graph illustrating two model oil $T_2$ distributions generated with a three parameter scheme.
Figure 14:
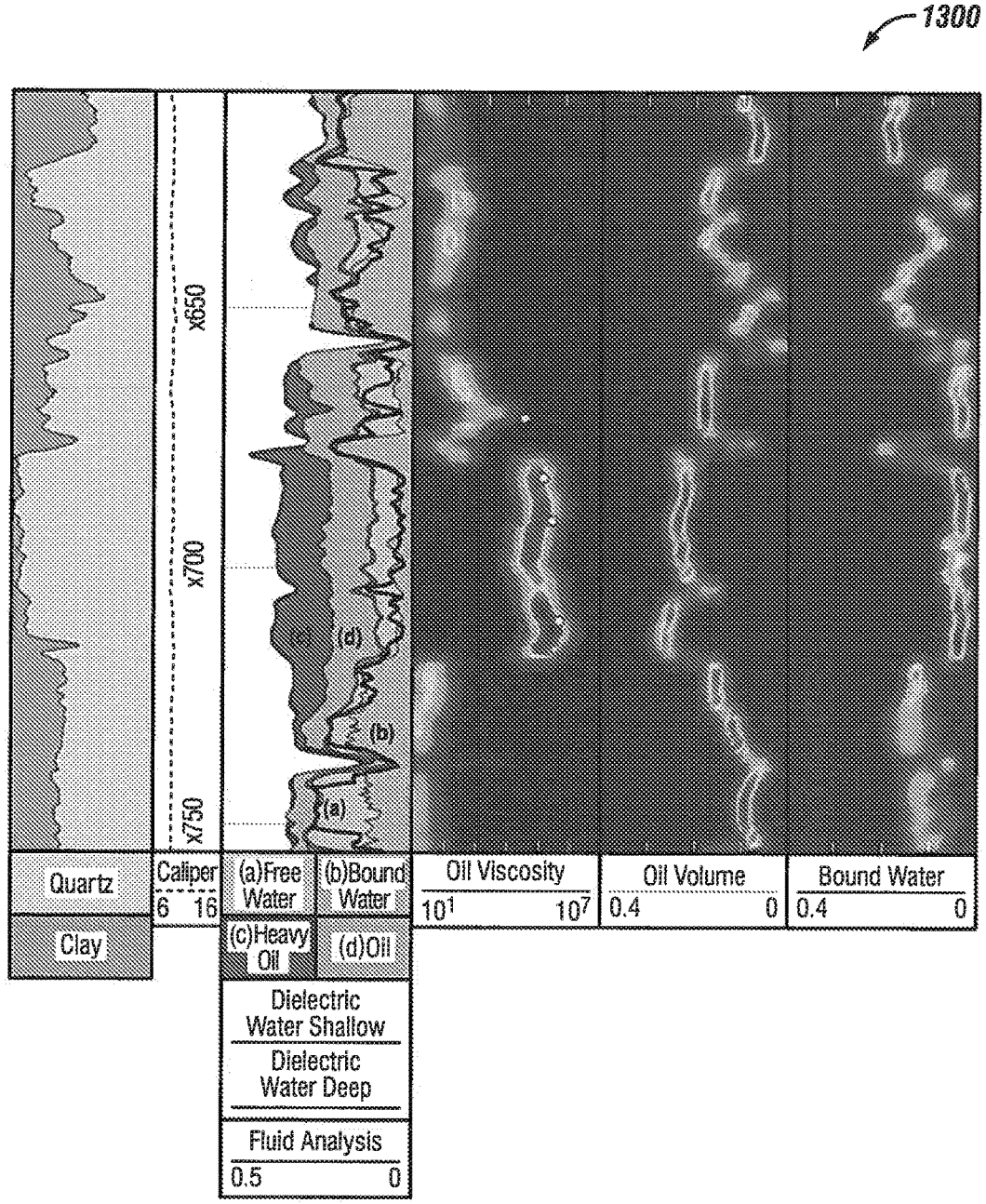
FIG. 14 is series of plots of statistical analysis data generated based upon the field log data shown in FIG. 13 in accordance with an example embodiment.

Referring additionally to FIG. 10, outputs 1400 are shown which results from the above-described statistical method. Fluid volumes are plotted in Track 2 (right of depth track). Following the same format as the previous example, free and bound water are respectively noted by (a) and (b) in FIG. 13. The dark shading labeled "Heavy Oil" (c) refers to oil signal that was not captured by the NMR measurement, and lighter shading labeled "Oil" (d) corresponds to visible oil signal which was detected by NMR. Note that the limit of visible and invisible oil signal is a function of the tool type and acquisition parameters, in particular the echo spacing. In this case an echo spacing of 200 μs was employed, providing desired coverage of fast decaying components. Nonetheless, as indicated in FIGS. 13 and 14, there is still a substantial fraction of the oil signal which is not captured, suggesting the presence of a very high viscosity oil. This is confirmed in the 3rd track, which shows the viscosity distribution. In the zone centered around x700, viscosities as high as $10^6$ cp are indicated. Above ~x680, viscosities drop by between 1 and 2 orders of magnitude. This dramatic variation in viscosity is confirmed by laboratory viscosity measurements of fluid from cored samples. Four sample viscosities are plotted as points on the distributions. Note the relatively good agreement between sample and log viscosity values around ~x700. The sharp transition predicted at ~x680 is confirmed by the core measurement at x670, for which the viscosity is an order of magnitude lower than that of the sample just a short distance lower at ~685.

Another interesting observation from these results concerns the water volume. The volumes plotted in track 2 correspond to the DOI of the NMR tool, about 1.1 in. At this DOI, significant free water fraction is identified, placing in question whether the formation is at irreducible saturation. However, radial processing of the dielectric dispersion data provides shallow and "deep" water filled porosity logs. The shallow measurement corresponds to a DOI comparable to that of the NMR measurement (i.e., <2 in.), whereas the deep water volume corresponds to formation further than 2 in. from the borehole. The deep water filled porosity log overlayed on track 2 follows the bound water volume provided by the Monte Carlo analysis, which is driven by the NMR measurement. The relatively good agreement between deep water volume and NMR-derived bound water volume indicates that the reservoir is at or close to irreducible saturation.

Another example was taken from the South Belridge field in California. This unconventional reservoir includes a diatomite formation. Reservoir rock is predominantly Opal A/Ct with some clay, quartz, feldspar and minor amounts of carbonate and heavy minerals. The Opal includes whole and broken diatoms (single cell algae with siliceous skeletons) that results in an relatively high porosity (up to 70%) and low permeability. The best reservoirs are found where the diatoms are in the original Opal-A phase (~60% porosity) before they change diagnenetically into Opal-Ct, which occurs with increasing depth and temperature.

Variable and unpredictable water salinity due to a history of multiple injections has resulted in increasingly difficult interpretation with conventional resistivity logging. Dielectric dispersion provides an ideal solution to this interpretation challenge, since the measurement provides both water salinity and volume. Viscosity is a factor in determining production and EOR strategies in the Belridge field. In view of the costs associated with oil property estimation from samples, a reliable method for determining in-situ viscosity from log data may be desirable. Studies of oil samples from the Belridge field indicate mostly intermediate viscosity oil, ranging from about 3 to 40 cp.

A comprehensive suite of logs was acquired in one well, including dielectric dispersion and multi-frequency NMR logs. The NMR acquisition included a suite of diffusion measurements at two frequencies corresponding to depths of investigation of 1.5 in. and 2.7 in. Field results are shown in the plot 1500 of FIG. 15. The log formats follow those used in previous examples. The leftmost track shows lithology derived from spectroscopy logs. Tracks 2 and 3 again present the dielectric permittivity and conductivity dispersion. Track 4 includes density porosity and NMR porosity log for the 1.5 in. DOI. Here, the density porosity was computed using a grain density $\rho_m$=2.42 g/cc, consistent with a diatomite formation with ~50% opal content. In contrast with previous examples, no significant NMR porosity deficit is observed. This implies that the oil NMR response decays slowly enough to be fully captured by the measurement, consistent with lower viscosity oil.

In this example the formation is relatively homogenous over the logged interval, although there are some gradual trends. In particular, below ~x300 the NMR $T_2$ distribution displays a peak at 200-300 ms, which fades out above this depth.

Figure 15:
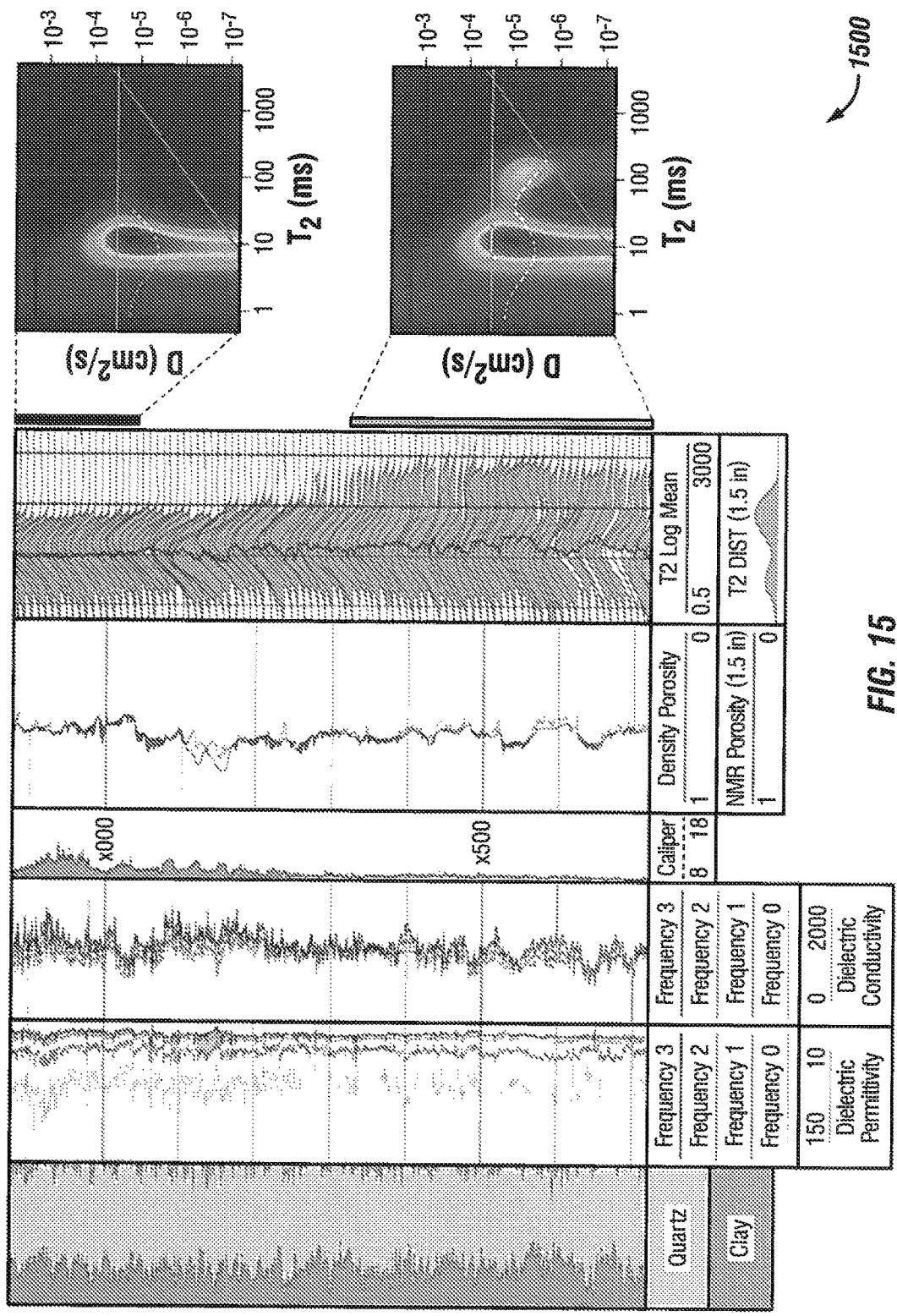
FIG. 15 is a series of plots of field log data from a second example well drilled through a diatomite formation.

Further insight into the fluid distribution is provided by NMR diffusion maps, presented for upper and lower intervals, as indicated in FIG. 15. The maps are presented for the 1.5 in. DOI measurements. However, virtually identical results were obtained for the 2.7 in. DOI. The lower interval maps confirm that the $T_2$ peak observed at ~200-300 ms in the depth log is associated with oil, indicated by its low diffusivity. In the upper interval maps, this peak is absent, as expected from the depth log. It is not possible to determine solely from the NMR data whether the disappearance of the low diffusivity peak is due to increased water saturation or an increase in oil viscosity. To progress further may necessitate water saturation from the dielectric logs. In this case, there was little evidence of invasion effects in the dielectric logs or NMR data. Consequently radial processing of the dielectric dispersion data was avoided and a single near-wellbore water filled porosity log was computed.

Figure 16:
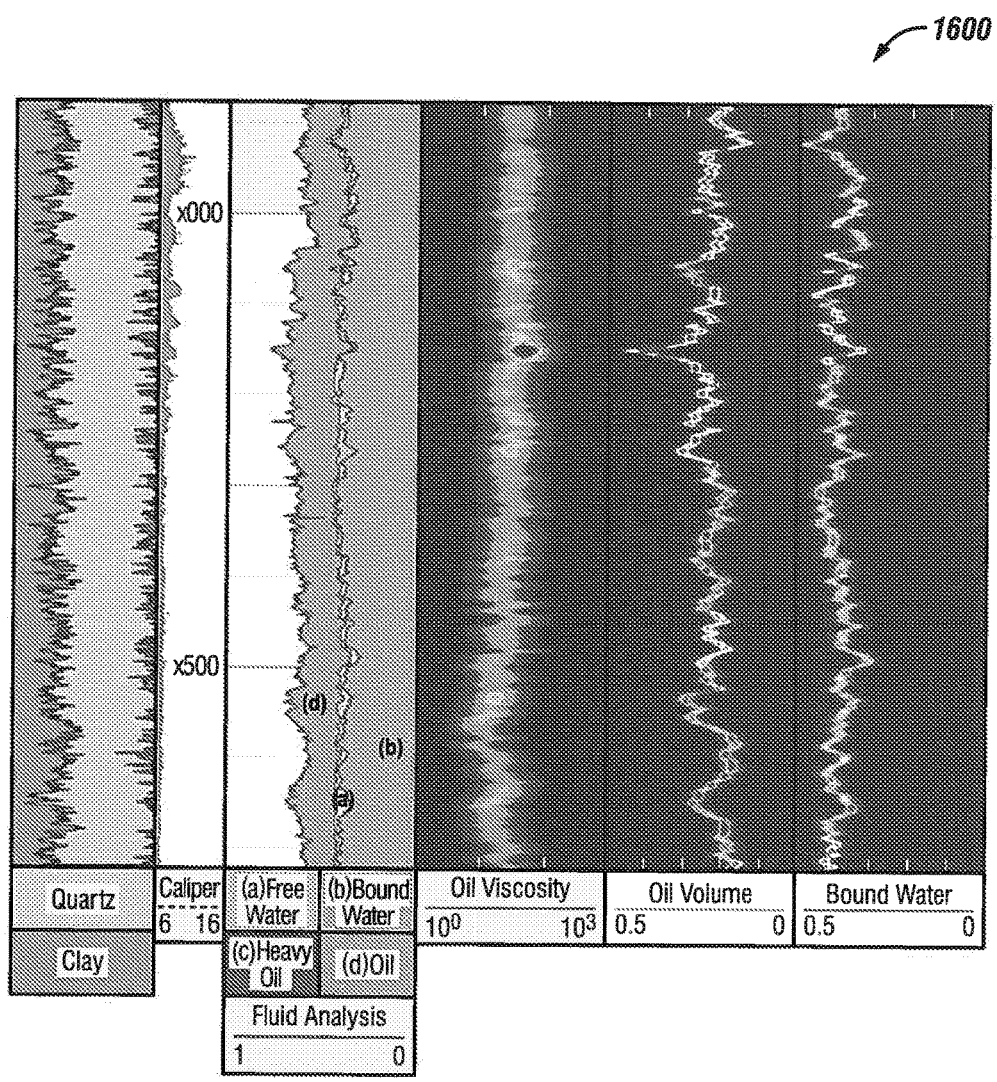
FIG. 16 is series of plots of statistical analysis data generated based upon the field log data shown in FIG. 15 in accordance with an example embodiment.

Results of the statistical analysis for the South Belridge data are presented by the outputs 1600 in FIG. 16. Lithology is shown in track 1. The fluid volumes in track 2 correspond to the 1.5 in. DOI. However, since there is no observable invasion, virtually identical results are obtained for the 2.7 in. DOI. For the purposes of this analysis, a $T_2$ cutoff of 33 ms was applied. This value is typical for sandstones but was found to be also valid coincidentally to Belridge diatomites. Tracks 4 and 5 present distributions for oil volume and bound water volume respectively. The viscosity distribution in track 3 shows a gradual but consistent trend from below 10 cp in the lower section to about 40 cp at the top. A short interval is observed at about x150 where a higher viscosity oil (~50-60 cp) is identified. This range of viscosities is in accordance with the expected viscosities for this field, based on previous studies. The trend of decreasing viscosity (increasing API gravity) with increasing depth is a known feature of the Belridge formation.

Accordingly, it will be appreciated that the combination of dielectric dispersion and NMR logs provides a useful tool for the evaluation of heavy oil reservoirs. Commensurate radial responses and the complementary information content of the logs make them well suited for combined analysis. Furthermore, the intrinsic physics of both measurements favors their performance in typical heavy oil environments, where fresh formation water can be challenging for typical log analysis.

A new workflow was presented above which combines NMR and dielectric dispersion measurements together with porosity information from nuclear logs or other external analysis. The workflow adopts a Monte Carlo procedure, for example, to provide realistic uncertainties in derived answers due to variations in model parameters. An output of the workflow is oil viscosity, which is a desired input for production strategy decisions in heavy oil reservoirs. Multiple case studies from very different environments have been presented, with oil viscosities ranging over almost five orders of magnitude. Log viscosities provided by the method agree well with sample measurements, where available.

The statistical method set forth above has been specifically applied to the characterization of heavy oil reservoirs. However, as noted above, this approach may be similarly extended to other applications. For example, for heavy oil analysis in shaly sands, water diffusion may be characterized by a free diffusion expression with a single diffusion constant, as described by the kernel of Equation 21. In more restricted environments, such as some carbonates, the apparent water diffusion rate may be reduced from its free diffusion value due to the confinement imposed by the rock matrix. In this case, a more detailed model may be used to account for the diffusion process. The degree of restriction may itself be determined based upon the pore size. The effective surface relaxivity, rho, relates $T_2$ relaxation time to pore size, and allows an effective water diffusion constant to be computed as a function of $T_2$. This parameter (rho) may be included in the set of varied parameters during Monte Carlo iteration. It should be noted that in cases where restricted diffusion is appreciable, optimization of rho leads to a quantitative estimate of the pore size distribution, which is desirable for understanding producibility and permeability.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A method for determining at least one characteristic of a geological formation having a wellbore therein, the method comprising:
   collecting nuclear magnetic resonance (NMR) data for the geological formation adjacent the wellbore, said NMR data being generated by logging the geological formation with an NMR logging tool deployed in the wellbore;
   collecting non-NMR data for the geological formation adjacent the wellbore, said non-NMR data being generated by logging the geological formation with a non-NMR logging tool deployed in the wellbore; and
   performing a Monte Carlo analysis based upon a combination of the collected NMR and non-NMR data to determine the at least one characteristic of the geological formation having a bounded uncertainty associated therewith, wherein the Monte Carlo analysis is performed on variables comprising total porosity and water volume of the geological formation with input probability distributions defined by measured total porosity and water-filled porosity.

2. The method of claim 1 wherein the non-NMR data comprises dielectric dispersion data.

3. The method of claim 1 wherein the non-NMR data comprises resistivity data.

4. The method of claim 1 wherein the non-NMR data comprises nuclear measurement data, sonic data, or ELAN analysis data.

5. The method of claim 1 wherein the at least one characteristic of the geological formation comprises a volume of a material within the geological formation.

6. The method of claim 1 wherein the at least one characteristic of the geological formation comprises a viscosity of a material within the geological formation.

7. The method of claim 1 wherein the at least one characteristic of the geological formation comprises a volume of water within the geological formation.

8. The method of claim 1 wherein performing the Monte Carlo analysis further comprises performing a Metropolis-Hastings Monte Carlo analysis.

9. The method of claim 1 wherein the NMR data comprises at least echo amplitudes.

10. The method of claim 1 wherein performing the Monte Carlo analysis comprises performing the Monte Carlo analysis based upon a forward model relating the collected NMR data and collected non-NMR data to the at least one characteristic of the geological formation.

11. The method of claim 1 wherein performing the Monte Carlo analysis comprises performing the Monte Carlo analysis based upon at least one water kernel parameter and at least one oil kernel parameter.

12. A method for determining at least one characteristic of a fluid in geological formation, the method comprising:
   collecting nuclear magnetic resonance (NMR) data for the fluid, said NMR data being generated by an NMR logging tool deployed in a wellbore traversing the geological formation;
   collecting non-NMR data for the fluid, said non-NMR data being generated by a non-NMR logging tool deployed in the wellbore traversing the geological formation; and
   performing a Monte Carlo analysis using as input parameters a combination of the collected NMR and non-NMR data to determine the at least one characteristic of the fluid having a bounded uncertainty associated therewith, wherein the Monte Carlo analysis is performed on variables comprising total porosity and water volume of the geological formation with input probability distributions defined by measured total porosity and water-filled porosity.

13. The method of claim 12 wherein the non-NMR data comprises dielectric dispersion data.

14. The method of claim 12 wherein the non-NMR data comprises resistivity data.

15. The method of claim 12 wherein the non-NMR data comprises nuclear measurement data, sonic data, or ELAN analysis data.

16. The method of claim 12 wherein the at least one characteristic of the fluid comprises a volume of the fluid within the geological formation.

17. The method of claim 12 wherein the at least one characteristic of the fluid comprises a viscosity of the fluid within the geological formation.

18. A well-logging system comprising:
   at least one nuclear magnetic resonance (NMR) well logging tool to collect nuclear magnetic resonance (NMR) data for a geological formation adjacent a wellbore;
   at least one non-NMR well logging tool to collect non-NMR data for the geological formation adjacent the wellbore; and
   a processor to perform a Monte Carlo analysis based upon a combination of the collected NMR and non-NMR data from said at least one well logging tool to determine the at least one characteristic of the geological formation having a bounded uncertainty associated therewith, wherein the Monte Carlo analysis is performed on variables comprising total porosity and water volume of the geological formation with input probability distributions defined by measured total porosity and water-filled porosity.

19. The well-logging system of claim 18 wherein the non-NMR data comprises dielectric dispersion data.

20. The well-logging system of claim 18 wherein the non-NMR data comprises resistivity data.

21. The well-logging system of claim 18 wherein the non-NMR data comprises nuclear measurement data, sonic data, or ELAN analysis data.

22. The well-logging system of claim 18 wherein the at least one characteristic of the geological formation comprises a volume of a material within the geological formation.

23. The well-logging system of claim 18 wherein the at least one characteristic of the geological formation comprises a viscosity of a material within the geological formation.

* * * * *